United States Patent
Nakamura

(10) Patent No.: US 8,462,228 B2
(45) Date of Patent: Jun. 11, 2013

(54) IMAGE PROCESSING METHOD, APPARATUS AND COMPUTER PROGRAM PRODUCT, AND IMAGING APPARATUS, METHOD AND COMPUTER PROGRAM PRODUCT

(75) Inventor: Tomokazu Nakamura, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 11 days.

(21) Appl. No.: 13/333,661

(22) Filed: Dec. 21, 2011

(65) Prior Publication Data

US 2012/0092523 A1 Apr. 19, 2012

Related U.S. Application Data

(62) Division of application No. 12/163,773, filed on Jun. 27, 2008, now Pat. No. 8,106,961.

(30) Foreign Application Priority Data

Jun. 29, 2007 (JP) ................................. 2007-171586

(51) Int. Cl.
- H04N 5/228 (2006.01)
- H04N 9/73 (2006.01)
- H04N 5/222 (2006.01)
- G06K 9/00 (2006.01)

(52) U.S. Cl.
USPC .................. 348/224.1; 348/222.1; 348/223.1; 348/225.1; 348/370; 348/371; 382/162; 382/167

(58) Field of Classification Search
USPC ................... 348/207.99, 222.1–225.1, 229.1, 348/241, 254, 370–371; 382/162, 167–172, 382/254, 274
See application file for complete search history.

(56) References Cited

U.S. PATENT DOCUMENTS

| | | | |
|---|---|---|---|
| 6,678,407 B1 | 1/2004 | Tajima | |
| 6,727,943 B1 | 4/2004 | Juen | |
| 7,146,041 B2 * | 12/2006 | Takahashi | 382/167 |
| 7,702,148 B2 | 4/2010 | Hayaishi | |
| 7,728,880 B2 | 6/2010 | Hung et al. | |
| 7,808,531 B2 | 10/2010 | Kim et al. | |
| 7,868,929 B2 * | 1/2011 | Fujiwara | 348/223.1 |
| 8,310,561 B2 * | 11/2012 | Misawa et al. | 348/223.1 |
| 2003/0001958 A1 | 1/2003 | Hoshuyama | |
| 2004/0095478 A1 | 5/2004 | Takano et al. | |
| 2004/0212691 A1 | 10/2004 | Sato | |
| 2004/0228505 A1 | 11/2004 | Sugimoto | |

(Continued)

FOREIGN PATENT DOCUMENTS

JP 2007-011970 A 1/2007

*Primary Examiner* — Michael Osinski
(74) *Attorney, Agent, or Firm* — Birch, Stewart, Kolasch & Birch, LLP

(57) ABSTRACT

An appropriate white balance coefficient is calculated using an evaluation value of a specific chromaticity or an imaging condition, in addition to face area detection information, in the following manner. A first white balance coefficient is calculated by a first white balance coefficient calculation unit based on a color image, and a second white balance coefficient is calculated by a second white balance coefficient calculation unit based on a specific subject of the color image. Then, a third white balance coefficient is calculated by a white balance combining unit by weighting the first white balance coefficient and the second white balance coefficient based on an evaluation result of a specific chromaticity evaluation unit or an imaging condition of an imaging condition control unit.

9 Claims, 17 Drawing Sheets

U.S. PATENT DOCUMENTS

| | | |
|---|---|---|
| 2005/0047771 A1 | 3/2005 | Yuyama |
| 2005/0122409 A1* | 6/2005 | Takeshita .................. 348/223.1 |
| 2006/0133672 A1 | 6/2006 | Li |
| 2006/0171605 A1 | 8/2006 | Watanabe |
| 2006/0176379 A1 | 8/2006 | Hyodo |
| 2006/0268119 A1 | 11/2006 | Sugawara |
| 2006/0284991 A1* | 12/2006 | Ikeda ....................... 348/223.1 |
| 2007/0065006 A1 | 3/2007 | Wilensky |
| 2007/0070214 A1* | 3/2007 | Nakamura ................ 348/222.1 |
| 2007/0285530 A1 | 12/2007 | Kim et al. |
| 2008/0252749 A1* | 10/2008 | Fujiwara ................... 348/224.1 |
| 2009/0002518 A1 | 1/2009 | Nakamura |
| 2009/0021602 A1* | 1/2009 | Fujiwara et al. .......... 348/223.1 |

* cited by examiner

IMAGE PROCESSING METHOD, APPARATUS AND COMPUTER PROGRAM PRODUCT, AND IMAGING APPARATUS, METHOD AND COMPUTER PROGRAM PRODUCT

This application is a Divisional of application Ser. No. 12/163,773 filed on Jun. 27, 2008 now U.S. Pat. No. 8,106,961, which claims priority to Application No. 2007-171586, filed in Japan on Jun. 29, 2007. The entire content of all of the above applications are hereby incorporated by reference.

BACKGROUND OF THE INVENTION

1. Field of the Invention

The present invention relates to an image processing method, apparatus and computer program product, and imaging apparatus, method and computer program product. More specifically, the invention is directed to an image processing apparatus, method and computer program product for calculating a white balance correction coefficient for a color image obtained through imaging using a digital camera or the like. The invention also relates to an imaging apparatus, method and computer program product.

2. Description of the Related Art

Recently, it has been proposed to provide digital cameras with image processing functions, such as a function for correcting white balance of a color image of a subject including a face by making use of a face detection technique.

Imaging environments under which image data are obtained by digital cameras are not necessarily uniform. For example, image data are obtained by imaging performed under various imaging light sources, such as daylight, fluorescence light, tungsten light, and the like. Therefore, if an obtained image is displayed on the screen without any image processing on the image data, a color based on the light source may sometimes be reflected on the image.

Consequently, it is known that a white balance correction is performed to obtain appropriate image data which are not affected by the imaging light source.

In image processing in which a face area is detected from image signals obtained through photographing a subject, and white balance is adjusted for reproducing the face in a favorable color, U.S. Patent Application Publication No. 20060284991 discloses a digital camera that performs image processing for correcting white balance by obtaining a white balance correction value based on those of the image signals determined to be white and a white balance correction value based on image data of the detected face area, and combining the white balance correction values by weighting them according to a face detection accuracy evaluation value to obtain a final white balance correction value.

In the conventional digital camera described in U.S. Patent Application Publication No. 20060284991 that calculates a white balance correction coefficient by setting a weighting factor only by a face detection level, information of contributing factor is insufficient for setting the weighting factor, causing a problem that it can not calculate an appropriate white balance coefficient.

The present invention has been developed in view of the circumstances described above, and it is an object of the present invention to provide an image processing apparatus, method and computer program product capable of calculating an optimum white balance correction coefficient for stable white balance correction. It is a further object of the present invention to provide an imaging apparatus, method and computer program product capable of calculating an optimum white balance correction coefficient for stable white balance correction.

SUMMARY OF THE INVENTION

The image processing apparatus according to the present invention is an apparatus including:

a specific subject detection unit that detects a specific subject having a specific color from an assigned color image;

a specific chromaticity calculation unit that calculates a specific chromaticity from the specific color representing the specific subject;

a first white balance coefficient calculation unit that calculates a first white balance coefficient based on the color image;

a second white balance coefficient calculation unit that calculates a second white balance coefficient based on the specific subject;

a chromaticity evaluation unit that calculates a first chromaticity point by multiplying the calculated specific chromaticity by the first white balance coefficient, calculates a second chromaticity point by multiplying the calculated specific chromaticity by the second white balance coefficient, and evaluates the positional relationship between the first chromaticity point and the second chromaticity point in a color space; and a third white balance coefficient calculation unit that calculates a third white balance coefficient by weighting the first white balance coefficient and the second white balance coefficient based on a result of the evaluation by the chromaticity evaluation unit.

The image processing method according to the present invention is a method including the steps of:

detecting a specific subject having a specific color from an assigned color image;

calculating a specific chromaticity from the specific color representing the specific subject;

calculating a first white balance coefficient based on the color image;

calculating a second white balance coefficient based on the specific subject;

calculating a first chromaticity point by multiplying the calculated specific chromaticity by the first white balance coefficient, calculating a second chromaticity point by multiplying the calculated specific chromaticity by the second white balance coefficient, and evaluating the positional relationship between the first chromaticity point and the second chromaticity point in a color space; and calculating a third white balance coefficient by weighting the first white balance coefficient and the second white balance coefficient based on a result of the evaluation.

The computer program product for the image processing apparatus according to the present invention is a computer readable recording medium on which is recorded a program for causing a computer to perform the functions of:

detecting a specific subject having a specific color from an assigned color image;

calculating a specific chromaticity from the specific color representing the specific subject;

calculating a first white balance coefficient based on the color image;

calculating a second white balance coefficient based on the specific subject;

calculating a first chromaticity point by multiplying the calculated specific chromaticity by the first white balance coefficient, calculating a second chromaticity point by multiplying the calculated specific chromaticity by the second white balance coefficient, and evaluating the positional relationship between the first chromaticity point and the second chromaticity point in a color space; and calculating a third white balance coefficient by weighting the first white balance coefficient and the second white balance coefficient based on a result of the evaluation.

The imaging apparatus according to the present invention is an apparatus including:

a flash emission unit capable of emitting flash light;

an imaging condition control unit that controls imaging conditions including control of flash emission of the flash emission unit;

an image pickup unit that obtains a color image by imaging a subject;

a specific subject detection unit that detects a specific subject having a specific color from the color image obtained by the image pickup unit;

a first white balance coefficient calculation unit that calculates a first white balance coefficient based on the color image;

a second white balance coefficient calculation unit that calculates a second white balance coefficient based on the specific subject;

a luminance weighting factor calculation unit that calculates a luminance weighting factor based on presence or absence of flash emission controlled by the imaging condition control unit;

a third white balance coefficient calculation unit that calculates a third white balance coefficient by weighting the first white balance coefficient and the second white balance coefficient according to the luminance weighting factor; and a white balance correction unit that corrects the color image using the calculated third white balance coefficient.

The imaging method according to the present invention is a method including the steps of:

obtaining a color image by imaging a subject using controlled flash emission;

detecting a specific subject having a specific color from the obtained color image;

calculating a first white balance coefficient based on the obtained color image;

calculating a second white balance coefficient based on the detected specific subject;

calculating a luminance weighting factor based on presence or absence of the controlled flash emission;

calculating a third white balance coefficient by weighting the first white balance coefficient and the second white balance coefficient according to the luminance weighting factor; and correcting the color image using the calculated third white balance coefficient.

The computer program product for the imaging apparatus according to the present invention is a computer readable recording medium on which is recorded a program for causing a computer to perform the functions of:

causing flash light to be emitted;

controlling imaging conditions including control of the flash emission;

causing a color image representing a subject to be imaged;

detecting a specific subject having a specific color from the obtained color image;

calculating a specific chromaticity from the specific color representing the specific subject;

calculating a first white balance coefficient based on the color image;

calculating a second white balance coefficient based on the specific subject;

calculating a luminance weighting factor based on presence or absence of the controlled flash emission;

calculating a third white balance coefficient by weighting the first white balance coefficient and the second white balance coefficient according to the luminance weighting factor; and correcting the color image using the calculated third white balance coefficient.

The term "color image" as used herein means image data including a color component.

The term "specific subject" as used herein means a partial image region representing a specific subject included in the color image. The specific subject may be, for example, an image representing a person's face, body, hand, foot, or otherwise an animal face, or the like.

The specific subject detection unit is a part of the image processing apparatus or the imaging apparatus, and automatically detects a specific subject based on an evaluation value that indicates likeness of a face area, such as the position, size, orientation, inclination, saturation, hue, or the like.

The term "specific chromaticity" as used herein means a chromaticity value of a specific color calculated from the specific subject. For example, it may be a skin chromaticity which is a chromaticity value of a skin color calculated from the specific subject.

The specific chromaticity calculation unit is a unit that calculates the chromaticity value. For example, it may be a unit that divides the specific subject into a plurality of regions, calculates a chromaticity point of each of the divided regions, and calculates an average value of a plurality of chromaticity points distributed thicker than or equal to a predetermined density in a distribution of the chromaticity points of the divided regions in a chromaticity space thereof as the specific chromaticity. Further, it may calculate the specific chromaticity by calculating an average luminance value of each of the regions, setting a weighting factor based on the magnitude of the calculated average luminance value, and weighting the plurality of chromaticity points distributed thicker than or equal to a predetermined density according to the determined weighting factor.

The first white balance coefficient calculation unit is a unit that calculates a white balance coefficient for correcting white balance based on the color image. For example, it includes a white chromaticity calculation unit that divides an assigned color image into a plurality of regions, calculates a chromaticity point of each of the divided regions, and an average of the calculated chromaticity points located within a region representing white chromaticity in a chromaticity space of the chromaticity points of the divided regions as a first white chromaticity.

The second white balance coefficient calculation unit is a unit that calculates a white balance coefficient for correcting white balance based on the specific subject. For example, it includes: a database having standard chromaticity data that indicate the correspondence relationship between each of a variety of light sources and each of a plurality of standard chromaticities imaged under each of the light sources, and white chromaticity data that indicate the correspondence relationship between a chromaticity of the specific color and a chromaticity of a white color; a standard light source selection unit that determines a standard chromaticity that approximates to the calculated specific chromaticity from the plurality of standard chromaticities and selects one or more light sources corresponding to the determined standard chromaticity; a chromaticity difference calculation unit that calculates one or more sets of chromaticity difference information representing a chromaticity difference from the determined standard chromaticity to the calculated specific chromaticity; and a white chromaticity correction unit that obtains one or more white chromaticities corresponding to the determined standard chromaticity based on the white chromaticity data and corrects the one or more white chromaticities by referring to the one or more sets of chromaticity difference information.

The chromaticity evaluation unit is a unit that evaluates the positional relationship between chromaticity points in a color space. For example, it may be a unit that calculates a first chromaticity point by multiplying the calculated specific chromaticity by the first white balance coefficient, calculating a second chromaticity point by multiplying the calculated specific chromaticity by the second white balance coefficient, and evaluating the positional relationship between the first chromaticity point and the second chromaticity point in a color space. Further, it may be a unit that sets a predetermined valid region centered on the second chromaticity point, evaluates a chromaticity difference from the first chromaticity point to the predetermined valid region, and sets a weighting factor such that the smaller the evaluated chromaticity difference, the greater the weighting factor. Still further, it may be it may be a unit that sets the weighting factor to zero when evaluating the first chromaticity point to be located outside of the predetermined valid region.

The term "standard chromaticity data" as used herein means a group of information that indicates the correspondence relationship between each of a variety of light sources and each of chromaticities of a specific color imaged under each of the light sources. For example, it may be constituted by a plurality of chromaticity points on a blackbody trajectory of a specific color and a chromaticity point under at least one particular light source. Further, it may be constituted by a plurality of chromaticity points on a blackbody trajectory of a skin color and a chromaticity point under at least one particular light source.

The standard light source selection unit is a unit that estimates under which light source the assigned color image is obtained. For example, it estimates the light source by determining one of the chromaticity points of the standard chromaticity data located nearest to the calculated specific chromaticity as a standard chromaticity. Further, it may be a unit that determines a chromaticity point located next nearest to the calculated specific chromaticity as a second standard chromaticity.

The term "chromaticity difference information" as used herein means data indicating a distance between chromaticity points distributed in a chromaticity space. More specifically, it may be a chromaticity difference to the specific chromaticity calculated from the standard chromaticity. Further, it may be a chromaticity difference to the specific chromaticity calculated from the second standard chromaticity.

The term "determined standard chromaticity" as used herein means one of the chromaticity points of the standard chromaticity data determined as a standard chromaticity which approximates to the calculated specific chromaticity. For example, in the comparison between a distance to a plurality of chromaticity points on the blackbody trajectory and a distance to at least one chromaticity point under a particular light source, it is a chromaticity point of standard chromaticity located nearest to the calculated specific chromaticity. Further, it may be a second standard chromaticity which is a chromaticity point located next nearest after the nearest distant chromaticity point.

The term "white chromaticity data" as used herein means a group of information that indicates the correspondence relationship between a chromaticity of a specific color and a chromaticity of a white color.

The term "white chromaticity" as used herein means a chromaticity value of an achromatic color calculated from the image data. For example, it may be constituted by a first white chromaticity corresponding to the standard chromaticity determined based on the white chromaticity data and a second white chromaticity corresponding to the second standard chromaticity obtained based on the white chromaticity data.

The white chromaticity correction unit is a unit that corrects white chromaticity. It corrects the white chromaticity by, for example, weighting the first white chromaticity and second white chromaticity based on the first chromaticity difference information and the second chromaticity difference information respectively.

The white balance correction unit is a unit that performs a white balance correction on the assigned color image. For example, it corrects white balance based on the white chromaticity corrected by the white chromaticity correction unit.

According to the image processing apparatus, method and computer program product, and the imaging apparatus, method and computer program product of the present invention, a specific subject is detected from a color image, then a weighting factor is calculated considering an evaluation value of a specific chromaticity after white balance control or an imaging condition, and a white balance coefficient is calculated. This allows the white balance coefficient to be calculated more appropriately in comparison with the conventional technique in which the weighting factor is determined based only on an evaluation value of face detection accuracy.

DESCRIPTION OF THE PREFERRED EMBODIMENTS

Hereinafter, embodiments of the image processing apparatus of the present invention will be described in detail. In the embodiments, the image processing apparatus of the present invention will be described taking a digital camera as an example. But the applicable scope of the present invention is not limited to this, and the invention is also applicable, for example, to personal computers, printers, and other electronic devices having an electronic imaging function.

Figure 1:
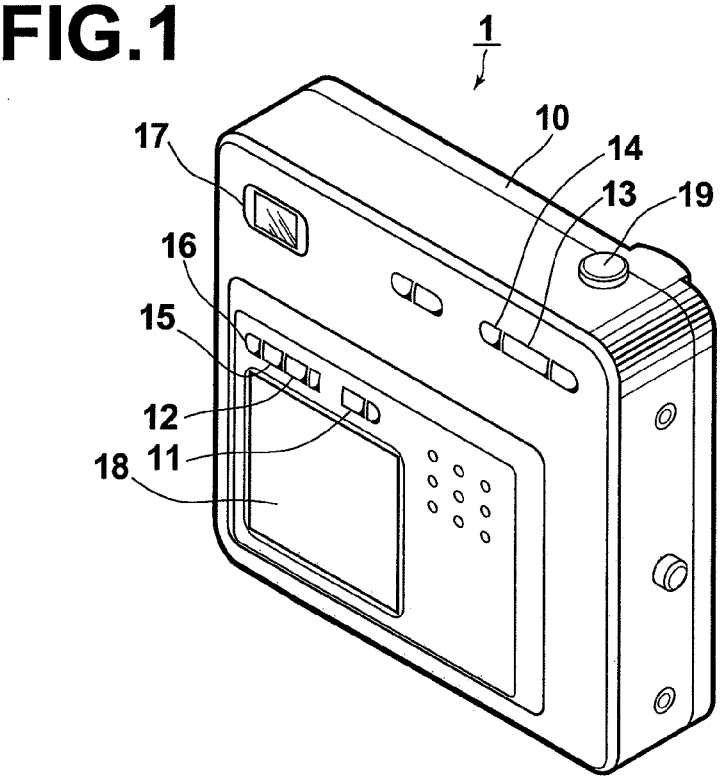
FIG. 1 is a rear view of a digital camera.
Figure 2:
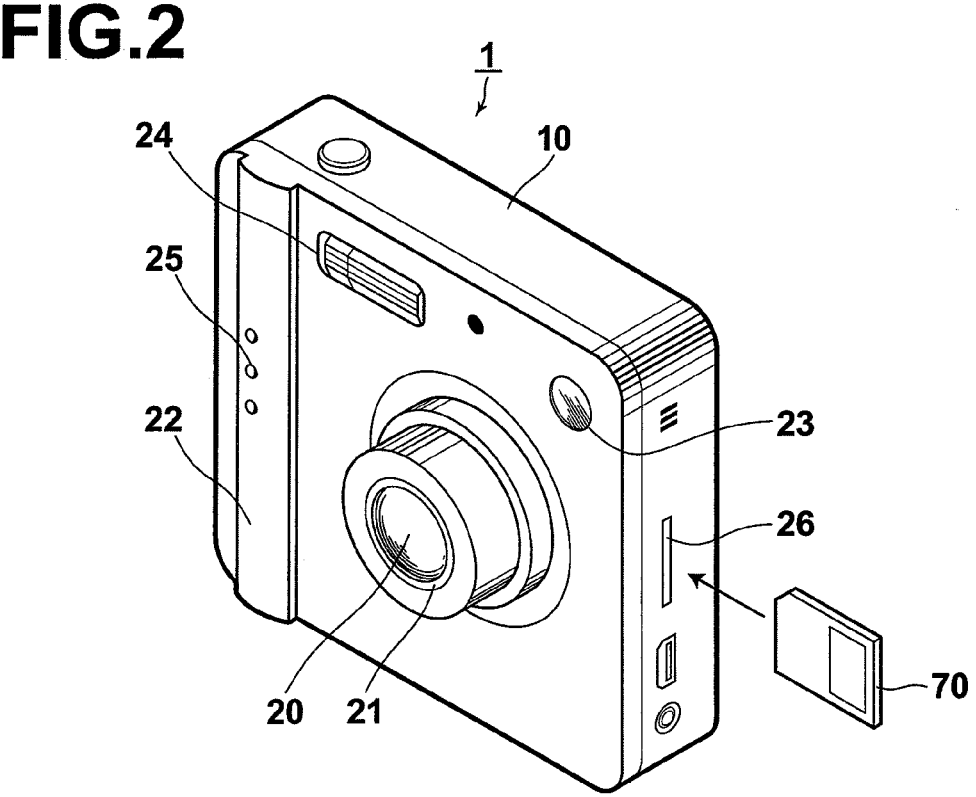
FIG. 2 is a front view of the digital camera.

FIGS. 1 and 2 are external views of an example digital camera viewed from the rear side and front side respectively. As shown in FIG. 1, an operation mode switch 11, a menu/OK button 12, a zoom/up-down lever 13, a left-right button 14, a back (return) button 15, a display switch button 16 are provided on the rear face of a main body 10 of the digital camera 1 as the interface for user operation. The digital camera is further provided with a viewfinder 17 for imaging, and a monitor 18 and a release button 19 for photographing and playback operation.

The operation mode switch 11 is a slide switch for selecting still picture photographing mode, moving picture photographing mode, or playback mode as the operation mode. The menu/OK button 12 causes various setting menus to be displayed on the monitor 18, that is, every time it is depressed, a menu for setting photographing mode, flash emission mode, subject tracking mode and subject identification mode, self-timer ON/OFF, number of recording pixels, sensitivity, or the like is displayed on the monitor 18. The menu/OK button 12 is also used for selecting a menu item displayed on the monitor 18 and fixing the setting.

In the subject tracking mode, a moving subject is tracked and the tracked subject is imaged under an optimum imaging condition. When this mode is selected, a frame display unit 78, to be described later, is displayed.

The zoom/up-down lever 13 is used for zoom/wide angle control at the time of photographing by toggling it in up or down direction. It is also used for moving a cursor on a menu screen displayed on the monitor 18 in up or down direction when performing a setting operation. The left-right button 14 is used for moving a cursor on a menu screen displayed on the monitor 18 in left or right direction when performing a setting operation.

The back (return) button 15 is used to stop a setting operation and to display an immediately preceding screen by depressing it. The display switch button 16 is used to switch ON/OFF a display on the monitor 18 by depressing it. It is also used for switching various guidance displays, ON/OFF switching of a character display, and the like. The viewfinder 17 is used to adjust image composition and focus by looking through it at the time of photographing. The subject image viewed through the viewfinder 17 is displayed through a viewfinder window 23 on the front face of the main body 10.

The release button 19 is an operation button that allows two-step operations of halfway depression and full depression. When the release button 19 is depressed, a halfway depression or a full depression signal is outputted to a CPU 75 via an operation system control unit 74, to be described later.

The contents set through an operation of each button or lever described above are confirmable by a display on the monitor 18, a lamp in the viewfinder 17, the position of the slide lever, and the like. Further, when performing photographing, a through image for confirming the subject is displayed on the monitor 18. Thus, the monitor 18 functions as an electronic viewfinder, as well as functioning as a playback display of a still picture or a moving picture after photographing and a display of various setting menus. When the release button 19 is fully depressed by a user, a photographing operation is performed and an image displayed on the monitor 18 based on data outputted from an illuminant estimation unit 67, a white balance (WB) calculation unit 63, and the like is recorded as a photographed image.

Further, as shown in FIG. 2, a taking lens 20, a lens cover 21, a power switch 22, the viewfinder window 23, a flash light 24, and a self-timer 25 are provided on the front face of the main body 10. In addition, a medium slot 26 is provided on a lateral side thereof.

The taking lens 20 is a lens for focusing a subject image on a predetermined imaging surface (e.g., CCD in the main body 10, or the like), and includes a focus lens, a zoom lens, and the like. The lens cover 21 is provided for covering the surface of the taking lens 20 to protect it from contamination, dust, and the like when power of the digital camera 1 is switched off, in playback mode, or the like.

The power switch 22 is a switch for activating or deactivating the digital camera 1. The flashlight 24 is provided for instantaneously irradiating light on the subject required for photographing when the shutter button 19 is depressed and while the shutter provided inside of the main body is open. The self-timer lamp 25 is provided for notifying the timing of open/close of the shutter, i.e., the timing of the start/end of the exposure when performing photographing using the self-timer. The medium slot 26 is provided for inserting an external recording medium 70, such as a memory card or the like. When the external recording medium 70 is inserted therein, a data reading or writing operation is performed.

Figure 3:
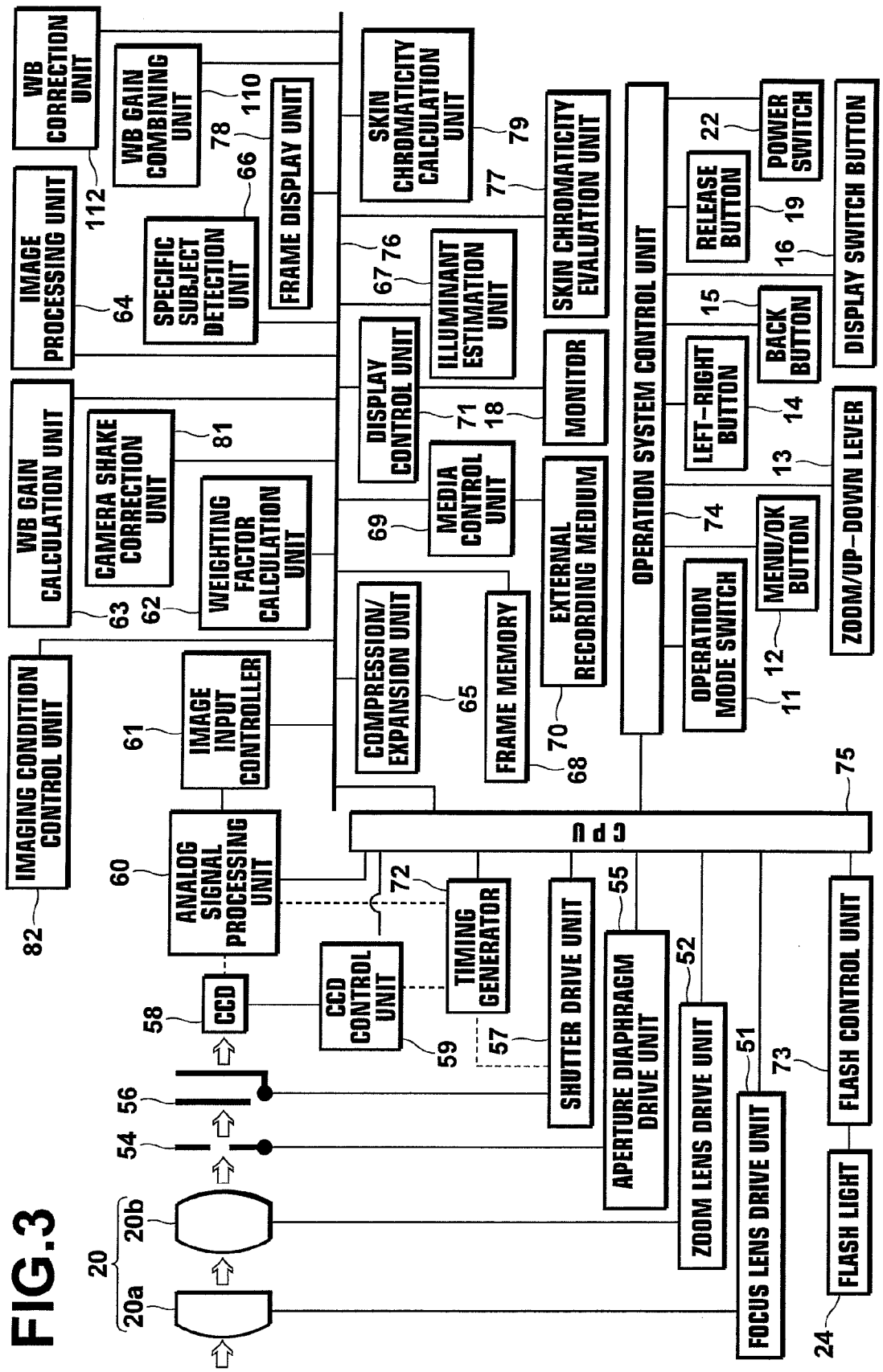
FIG. 3 is a functional block diagram of the digital camera.

FIG. 3 is a functional block diagram of the digital camera 1. As shown in FIG. 3, the digital camera 1 includes the operation mode switch 11, menu/OK button 12, zoom/up-down lever 13, left-right button 14, back (return) button 15, display switching button 16, shutter button 19, and power switch 22, as the operation system thereof. In addition, it includes an operation system control unit 74, which is the interface for conveying operation contents of these switches, buttons, and levers to the CPU 75.

The taking lens 20 is formed of a focus lens 20a and a zoom lens 20b. These lenses are step driven by the focus lens drive unit 51 and zoom lens drive unit 52 respectively, each including a motor and a motor driver, and movable in the optical axis directions. The focus lens drive unit 51 step drives the focus lens 20a based on focus control amount data obtained by the AF processing unit 62, The zoom lens drive unit 52 controls the step drive of the zoom lens 20b based on operated amount data of the zoom/up-down lever 13.

The aperture diaphragm 54 is driven by the aperture diaphragm drive unit 55 that includes a motor and a motor driver.

The shutter 56 is a mechanical shutter, and driven by the shutter drive unit 57 that includes a motor and a motor driver. The shutter drive unit 57 performs open/close control of the shutter 56 based on a depression signal of the release button 19 and the like.

A CCD 58, which is an image sensor, is provided on the rear side of the optical system described above. The CCD 58 has a photoelectric surface formed of multitudes of light receiving elements disposed in a matrix form, and a subject image transmitted through the imaging optical system is focused on the photoelectric surface and subjected to a photoelectric conversion. A microlens array (not shown) for directing light to respective pixels, and a color filter array (not shown) including R, G, and B filters arranged regularly are disposed in front of the photoelectric surface. The CCD 58 outputs charges stored in the respective pixels line by line as serial analog image data in synchronization with a vertical transfer clock signal and a horizontal transfer clock signal supplied from the CCD control thing 59. The charge storage time of each pixel (exposure time) is determined by an electronic shutter drive signal supplied from the CCD control unit 59.

Image signals outputted from the CCD 58 are inputted to the analog signal processing unit 60. The analog signal processing unit 60 includes: a correlated double sampling circuit (CDS) for removing noise from the image signals; an automatic gain controller (AGC) for regulating the gain of the image signals; and an A/D converter (ADC) for converting the image signals to digital image data. The digital image data are CCD-RAW data in which each pixel has RGB density values.

The timing generator 72 is provided for generating timing signals, which are inputted to the shutter drive unit 57, CCD control unit 59, and analog signal processing unit 60, thereby the operation of the shutter button 19, open/close of the shutter 56, charge acquisition in the CCD 58, and the processing in the analog signal processing unit 60 are synchronized. The flash control unit 73 controls the flashlight 24 for light emission.

The image input controller 61 writes the CCD-RAW data inputted from the analog signal processing unit in the frame memory 68. The frame memory 68 is a work memory used when various types of digital image processing (signal processing), to be described later, are performed. The frame memory 68 is formed of, for example, a SDRAM (Synchronous Dynamic Random Access Memory) that performs data transfer in synchronization with a bus clock signal having a constant frequency. The image input controller 61 may also record imaged data of a pre-image in the work memory, which are obtained before main photographing in response to instructions, such as use or non-use of flash emission, and the like.

The pre-image is obtained by photographing for determining a photographing condition (e.g., light control).

The display control unit 71 is provided for displaying image data stored in the frame memory 68 on the monitor 18 as a through image. The display control unit 71 combines, for example, a luminance (Y) signal and color (C) signals into a composite signal, and outputs the composite signal to the monitor 18. While photographing mode is selected, a through image is obtained at a predetermined time interval and displayed on the monitor 18. Further, the display control unit 71 displays an image, stored in an external recording medium 70 and included in the image file readout by the media control unit 69, on the monitor 18.

Figure 6:
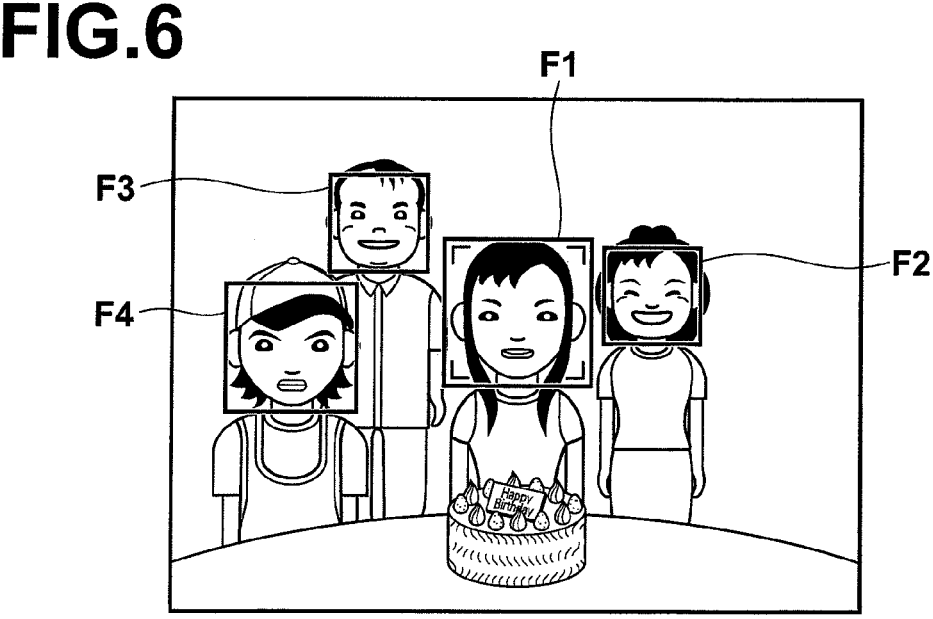
FIG. 6 illustrates an embodiment of the monitor display of the digital camera.

The frame display unit 78 is provided for displaying a frame having a predetermined size on the monitor 18 via the display control unit 71. FIG. 6 illustrates an embodiment of the display of the monitor 18. The frame display unit 78 causes tracking frames F1 to F4 enclosing specific subjects to be displayed on the monitor 18, as shown in FIG. 6, which is detected by a specific subject detection unit 66, to be described later, when the release button 19 is depressed half way. The tracking frame may be arranged such that it is displayed following the movement of a detected specific subject. For example, when the detected specific subject moves to a distance place, the tracking frame is displayed in a reduced size according to the size of the subject, and when the subject moves to a near place, the tracking frame is displayed in an enlarged size according to the size of the subject. Further, an arrangement may be adopted in which the face detection is performed by the specific subject detection unit 66 even before the release button is depressed half way, and a tracking frame for a detected face is displayed on the monitor 18 by the frame display unit 78.

The image processing unit 64 performs image quality corrections, such as gamma correction, sharpness correction, contrast correction, color correction and the like on the image data of a final image. In addition, it performs YC processing in which CCD-RAW data are converted to YC data constituted by Y data, which are luminance signal data, Cb data, which are blue chrominance difference signals, and Cr data, which are red chrominance difference signals. The term "final image" as used herein means an image based on image data picked up by the CCD 58 when the release button is fully depressed and stored in the frame memory 68 via the analog signal processing unit 60 and the image input controller 61.

The upper limit of the number of pixels of the final image is dependent on the number of pixels of the CCD 58. But the number of recording pixels may be changed, for example, by user settable image quality setting (fine, normal, or the like). In the mean time, the number of pixels of a pre-image may be less than that of a final image, e.g., 1/16 of the final image.

The compression/expansion unit 65 generates an image file by performing compression, for example, in JPEG format on the image data after processed by the image processing unit 64 for image quality corrections. Auxiliary information is attached to the image file based on one of a various types of data format. Further, the compression/expansion unit 65 reads out a compressed image file from an external recording medium 70 and performs expansion thereon in the playback mode. The expanded image data are outputted to the display control unit 71, which causes the monitor 18 to display an image based on the image data.

The data bus 76 is connected to the image input controller 61, weighting factor calculation unit 62, WB gain calculation unit 63, image processing unit 64, compression/expansion unit 65, specific subject detection unit 66, illuminant estimation unit 67, frame memory 68, various control units 69, 71, 82, skin chromaticity evaluation unit 77 (chromaticity evaluation unit), frame display unit 78, skin chromaticity calculation unit 79, CPU 75, WB gain combining unit 110, and WB correction unit 112, and various signals/data are transmitted and received through the data bus 76.

The upper limit of the number of pixels in the image data of the present invention is dependent on the number of pixels of the CCD 58. But the number of recording pixels may be changed, for example, by user settable image quality setting (fine, normal, or the like). In the mean time, the number of pixels of a through image or a pre-image may be less than that of a final image, e.g., 1/16 of the final image.

The camera shake correction unit 83 is provided for automatically correcting an image blur of a photographed image caused by a camera shake at the time of photographing.

The medium control unit (recording means) 69 corresponds to the medium slot 26 in FIG. 2 and reads out an image file or the like recorded on an external recording medium 70 or records an image file thereon. The CPU 75 controls each unit of the main body of the digital camera 1 in response to operations of various buttons, levers, switches, and signals from the respective functional blocks. The CPU 75 also functions as a recording means for recording an image file in a not shown internal memory.

The weighting factor calculation unit 62, specific subject detection unit 66, illuminant estimation unit 67, skin chromaticity evaluation unit 77 (chromaticity evaluation unit), skin chromaticity calculation unit 79 (specific chromaticity calculation unit), WB gain calculation unit 63, imaging condition control unit 82, WB gain correction unit 112, and WB correction unit 112 will be described in detail later.

Next, image processing steps involved in the correction of white balance performed after imaging in the digital camera 1 structured in the manner as described above will be described.

First Embodiment

Figure 4:
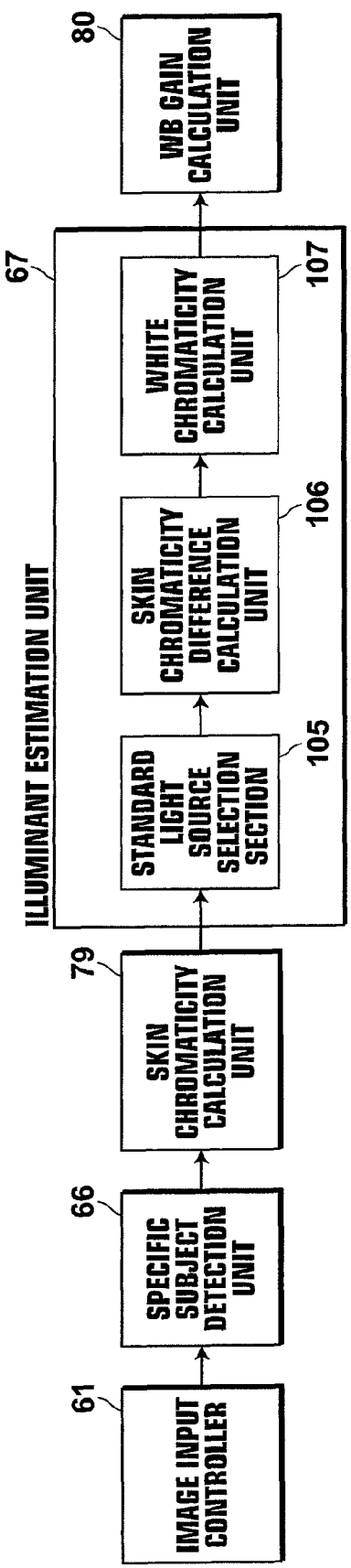
FIG. 4 is a functional block diagram related to a first embodiment.

FIG. 4 is a block diagram illustrating an electrical configuration involved in the calculation of a WB gain factor for correcting white balance in the first embodiment.

The configuration shown in FIG. 4 includes five units, namely the image input controller 61, specific subject detection unit 66, skin chromaticity calculation unit 79, illuminant estimation unit 67, and WB gain calculation unit 80.

The specific subject detection unit 66 detects a specific subject (e.g., a face) from a subject represented by image data read out from the image input controller 61, and calculates RGB values or the like obtainable from the detected face area.

The skin chromaticity calculation unit 79 (specific chromaticity calculation unit) eliminates noise components, such as background, face organs, and the like, from the image data of the face area, and calculates a specific chromaticity of a specific color from R/G-B/G space (a color space defined by R/G and B/G). Preferably, it detects a skin chromaticity, which is a chromaticity of a skin color.

The illuminant estimation unit 67 includes a standard light source selection unit 105, a skin chromaticity difference calculation unit 106 (chromaticity difference calculation unit), and a white chromaticity calculation unit 107.

The standard light source selection unit 105 has standard chromaticity data (a plurality of standard chromaticities) that indicate the correspondence relationship between each of a variety of light sources and a standard chromaticity representing a specific color imaged under each light source. It compares a specific chromaticity with the data of the chromaticity database and determines a specific chromaticity point among the chromaticities of a known specific color that approximates to the color component specific chromaticity as a standard chromaticity.

The database described above may be provided in a circuit other than the standard light source selection unit. Further, the digital camera 1 may includes an accessing means (standard chromaticity reference unit) for accessing a database located outside of the digital camera 1 or the database located in a circuit other than the standard light source selection unit.

Preferably, the database described above is a skin color database. It includes standard skin color data (a plurality of standard chromaticities) that indicates correspondence relationship between each of a variety of light sources and a standard skin chromaticity imaged under each light source. A skin chromaticity is compared with the data in the skin chromaticity database, and a skin color point among the known skin chromaticities that approximates to the skin chromaticity in the color component is determined as a standard skin chromaticity. The skin chromaticity difference calculation unit 106 (chromaticity difference calculation unit) calculates a chromaticity difference between the specific chromaticity and determined standard chromaticity. Preferably it calculates a chromaticity difference between the skin chromaticity and the determined standard skin chromaticity.

The white chromaticity calculation unit 107 has white chromaticity data that indicates the correspondence relationship between skin color chromaticity and white chromaticity, and corrects white chromaticity based on the chromaticity difference between the skin chromaticity and the determined standard skin chromaticity.

The WB gain calculation unit 80 calculates a WB gain factor for white balance correction performed in the WB correction unit 112 using the white chromaticity corrected by the white chromaticity calculation unit 107.

Hereinafter, processing performed in the image input controller 61, specific subject detection unit 66, skin chromaticity calculation unit 66, illuminant estimation unit 67, standard light source selection unit 105, skin chromaticity difference calculation unit 106, white chromaticity calculation unit 107, and WB gain calculation unit will be described with reference to FIGS. 5 to 13.

Figure 5:
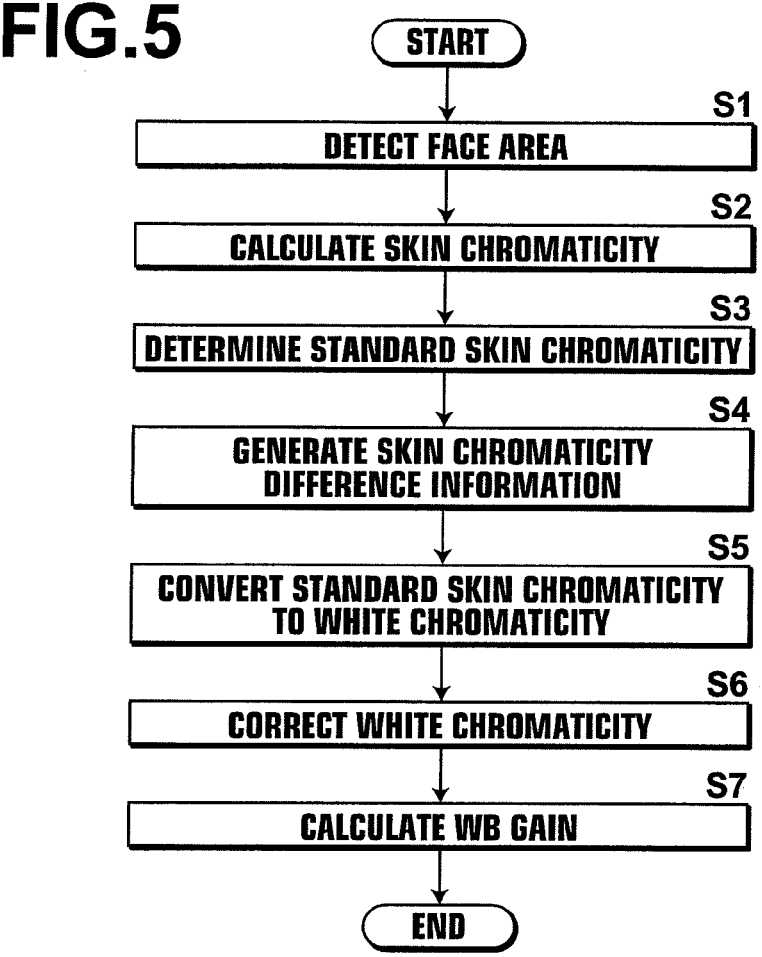
FIG. 5 is a processing flowchart related to the first embodiment.

FIG. 5 is a flowchart illustrating a processing flow involved in calculating the gain factor of white balance in the first embodiment.

Step S1 in the flowchart will be described. The specific subject detection unit 66 detects a specific subject (e.g., a face) from a subject represented by image data read out from the image input controller 61 and calculates RGB values or the like obtainable from the detected face area (step S1).

More specifically, when detecting a face area, processing that automatically detects the face area based on an evaluation value that indicates likeness of a face area, namely any one of the position, size, orientation, saturation, and hue is used.

For example, the method described in U.S. Patent Application Publication No. 20060133672 may be used. The method described in the U.S. Patent Application Publication No. 20060133672 uses a learning method based on AdaBoost in which face tracking is performed by a known method such as the motion vector, characteristic point detection, or the like, and a weighting factor with respect to learning data is updated sequentially when re-sampling the data to create learned machines, and finally an integrated learned machine is created by performing a weighted addition of the learned machines. For example, when building a frame model of a face by setting an average frame model on an actual face image, and deforming the average frame model by moving the position of each landmark on the average frame model such that the landmark position coincides with the position of the corresponding landmark detected from the face, the method detects the position of a relevant landmark from the face image using classifiers obtained by the machine learning method, in which a luminance profile at a point on a plurality of sample images known of a predetermined landmark and a luminance profile at a point on a plurality of sample images known not of the predetermined landmark are learned, and a discrimination condition with respect to each classifier.

Further, the method described in U.S. Patent Application Publication No. 20040228505 may also be used. The method described in U.S. Patent Application Publication No. 20040228505 is a method that uses an image data characteristic portion extraction method in which imaged data having a certain size is cut out from image data, and each cut-out image data is compared with reference characteristic portion image data to determine whether or not the characteristic portion image is present in the processing target image.

It is noted that an animal face or the like may be detected other than a person's face as described, for example, in Japanese Unexamined Patent Publication No. 2007-011970.

For example, FIG. 6 shows example image data obtained by photographing a family birthday party. F1 to F4 are frames enclosing faces detected by the specific subject detection unit 66.

Figure 8:
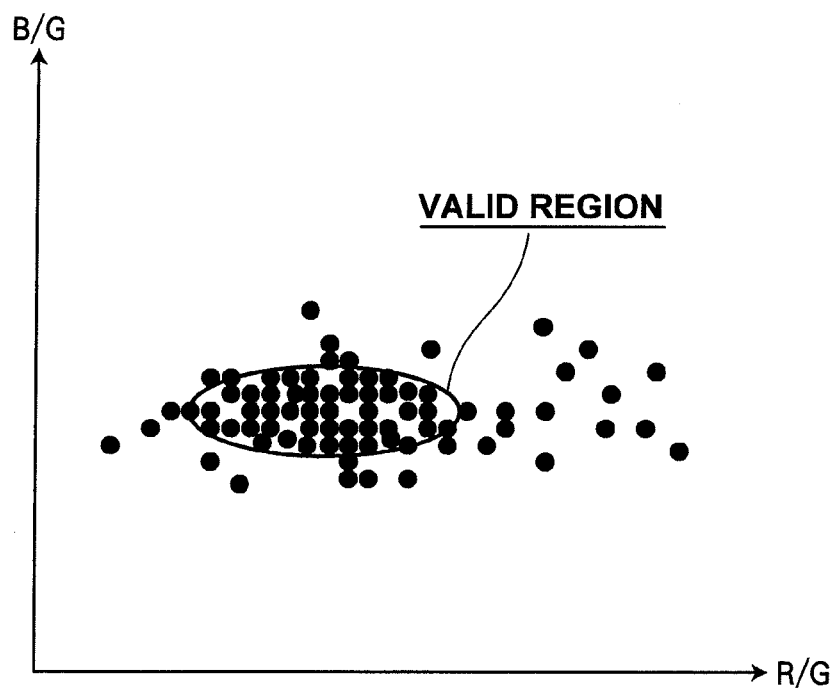
FIG. 8 is a schematic view illustrating plotted chromaticity points of skin.

Next, step S2 of the flowchart will be described. The skin chromaticity calculation unit 79 eliminates unnecessary noise components, such as the background, face organs, and the like, from a face detected by the specific subject detection unit 66, and calculates a skin chromaticity (R/G-B/G color space) (step S2). In one of specific methods for calculating the skin chromaticity, image data are divided into M×M regions (e.g., M=8). Then, an average value of RGB values in each region is calculated, and a chromaticity point of each region is plotted in the R/G-B/G space based on the calculated RGB value of each region (FIG. 8). Since a face area is predominated by skin pixels, so that the skin chromaticity calculation unit 79 presumes a portion where the chromaticity distribution is dense as a candidate of skin chromaticity. The valid region shown in FIG. 8 indicates skin chromaticity group of plotted chromaticity points. FIG. 8 shows that skin chromaticity candidates are converged in a certain density.

Figure 11:
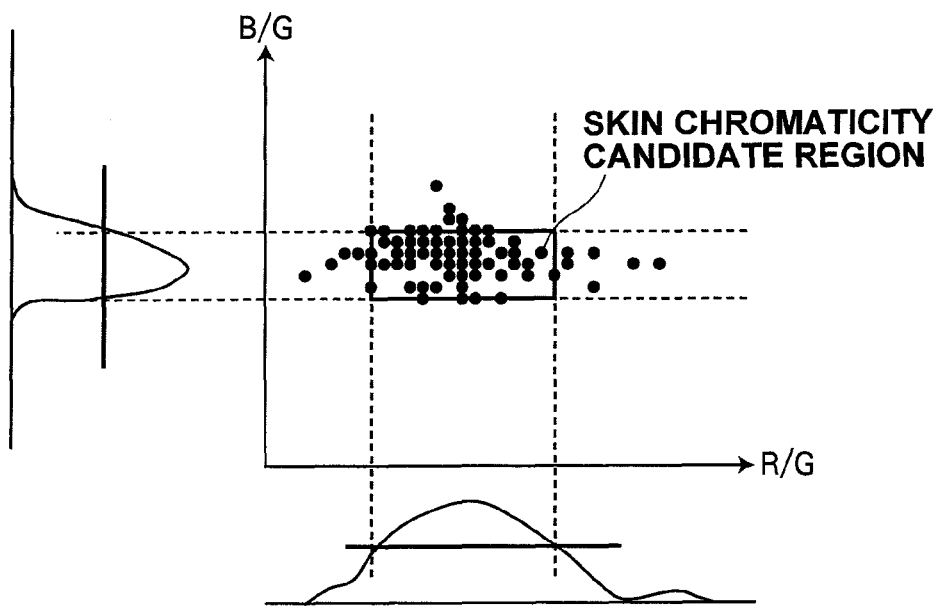
FIG. 11 illustrates histograms representing distribution densities of skin chromaticies.

Next, a histogram with respect to each of the R/G and B/G spaces is calculated based on the chromaticity points located in the valid region. FIG. 11 shows example histograms of the skin chromaticity groups plotted by the skin chromaticity calculation unit 79 created in the respective spaces of R/G and B/G. The region of a range having a frequency greater than or equal to a threshold value is defined as a skin color candidate region, and the skin chromaticity distribution included in the region is defined as skin chromaticity candidates.

Then, if a contrast is present in the face area, it is likely that the impact of the light source on chromaticity points is smaller in the dark portion in comparison with the bright portion. Therefore, according to the luminance value of each region, a weighted average value of chromaticity points of skin color candidates is calculated as the skin chromaticity by giving a greater weighting factor to a greater luminance value.

Figure 9:
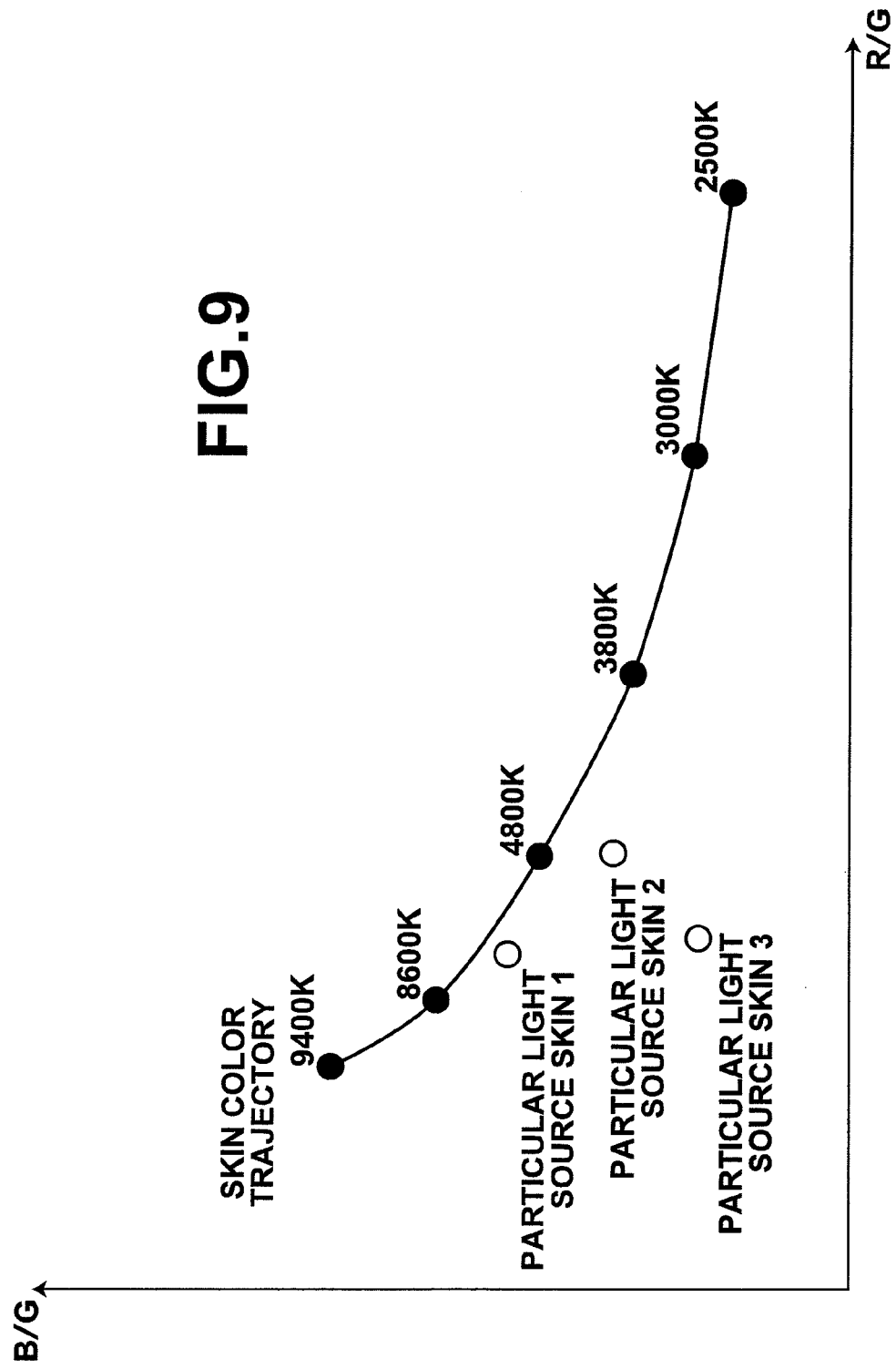
FIG. 9 is a schematic view illustrating standard skin chromaticity data.

Next, step S3 in the flowchart will be described. The standard light source selection unit 105 has standard skin chromaticity data that indicate the correspondence relationship between each of a variety of light sources and a standard skin chromaticity imaged under each light source, and the standard skin chromaticity data are constituted by a skin color trajectory and particular light sources 1, 2, and 3 (FIG. 9).

The skin color trajectory is a blackbody trajectory that indicates a change in the skin color when color temperature of the light source is changed. A skin chromaticity with respect to each of the particular light sources 1, 2, and 3 (particular light source skin) is a skin chromaticity under a particular light source that can not be represented by a light source corresponding to the blackbody trajectory. The particular light source includes, for example, a fluorescent lamp, a mercury lamp, or the like.

The standard light source selection unit 105 calculates a standard skin chromaticity that approximates to the calculated skin chromaticity from the standard skin chromaticity data. For example, the calculated skin chromaticity is compared with a predetermined standard skin chromaticity under each of variety of light sources (standard skin chromaticity data) to determine a standard skin chromaticity located at a distance closest to the skin chromaticity in the color space as the standard skin chromaticity (step S3). The term "distance" as used herein means, for example, Euclidean distance, Mahalanobis distance, or the like.

Figure 10:
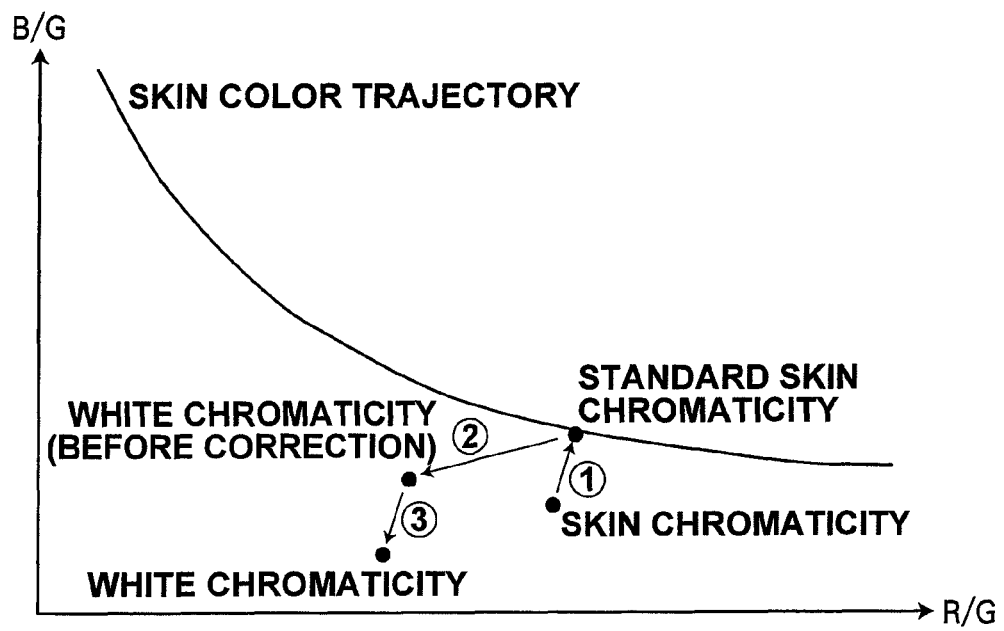
FIG. 10 is a schematic view illustrating a process of correcting white chromaticity (Part 1).

Next, step S4 of the flowchart will be described. The skin chromaticity difference calculation unit 106 calculates chromaticity difference information based on the chromaticity difference between the skin chromaticity in the color space and the standard skin chromaticity determined in step S3 (step S4). When the skin chromaticity is nearest to the skin color trajectory, the calculated skin chromaticity is referred to as (RG_1, BG_1), and the determined standard skin chromaticity is referred to as (RG_2, BG_2). This allows the chromaticity difference information between the skin chromaticity and the determined standard skin chromaticity to be calculated. FIG. 10 illustrates the relationships between the standard skin chromaticity determined as the skin color trajectory, skin chromaticity, and white chromaticities (before and after correction), to be described later.

Figure 13:
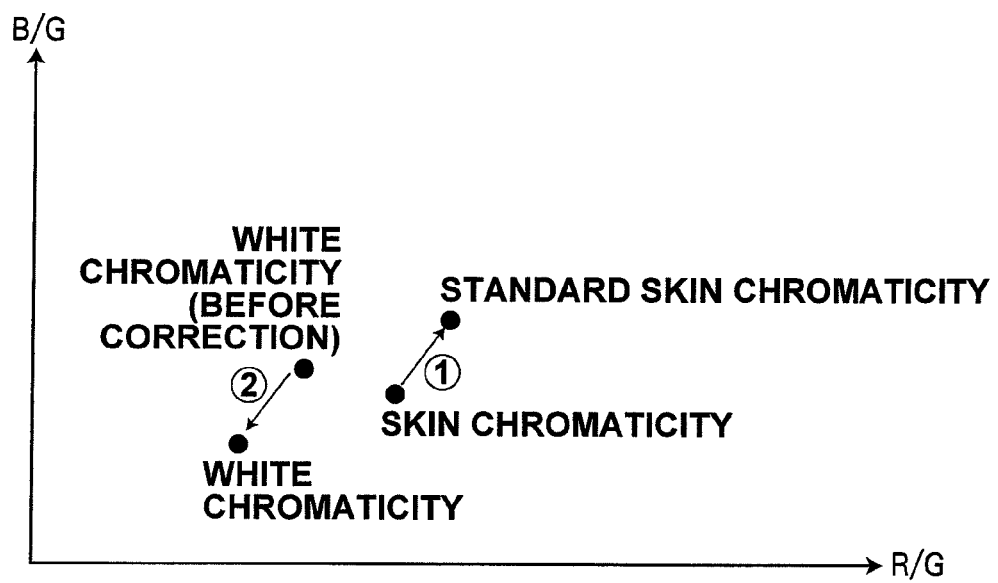
FIG. 13 is a schematic view illustrating a process of correcting white chromaticity (Part 2).

In step S5 of the flowchart, there may be a case in which the skin chromaticity is in the nearest relationship with a particular light source skin. FIG. 13 illustrates the relationship between chromaticity points of the skin and white color in the R/G-B/G space under a particular light source. The standard skin chromatiticies determined as the skin chromaticities are referred to as (RG_1, BG_1) and (RG_2, BG_2) respectively. In the case of the particular light source skin, the corresponding white chromaticity is found at only one point, which is referred to as (RG_3, BG_3).

Figure 12:
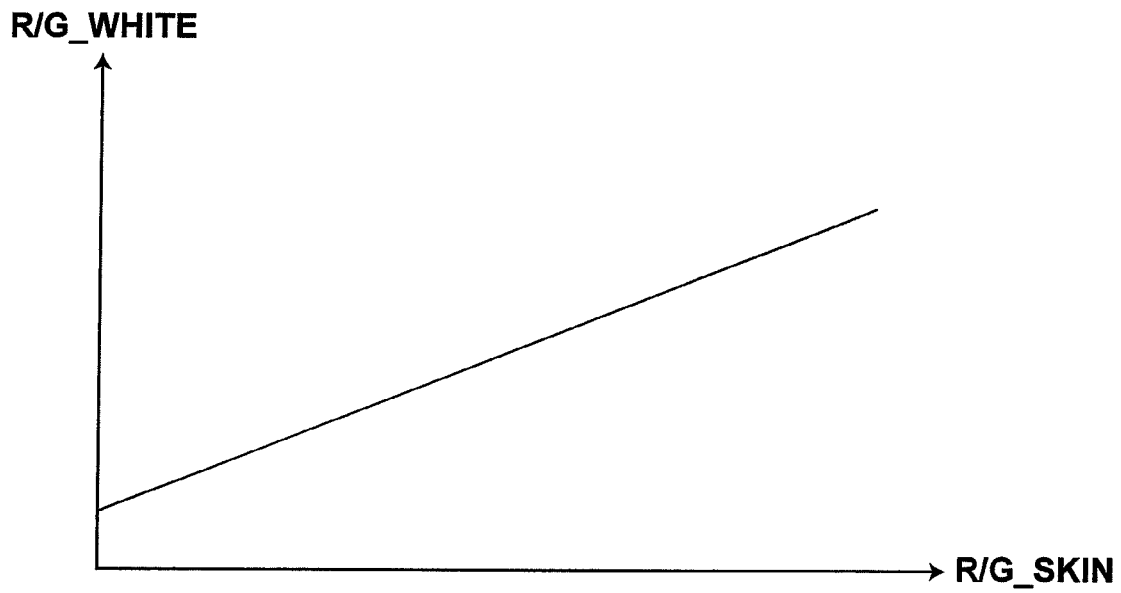
FIG. 12 illustrates white chromaticity data.

Next, step S5 of the flowchart will be described. The white chromaticity calculation unit 107 calculates a white chromaticity based on the chromaticity difference between the skin chromaticity and the determined standard skin chromaticity. The white chromaticity calculation unit 107 has white chromaticity data that indicates correspondence relationship between the skin color chromaticity and white chromaticity (FIG. 12). FIG. 12 illustrates the relationship of chromaticity points between the skin color and white color on the R/G axis of the R/G-B/G space. The white chromaticity calculation unit 107 may convert the standard skin chromaticity determined in step S3 to a white chromaticity (RG_3, BG_3) using this relationship, so that it may calculate the white chromaticity.

Next, step S6 of the flowchart will be described. Based on the positional relationship of the standard skin color chromaticity determined as the skin color chromaticity, the white chromaticity may be corrected by the relationships of formulae (1) and (2) below. Here, the corrected white chromaticity is referred to as (RG_W, BG_W).

$$RG\_W = RG\_3 \times (RG\_1)/RG\_2） \quad (1)$$

$$BG\_W = BG\_3 \times (BG\_1)/BG\_2） \quad (2)$$

Next, step S7 in the flowchart will be described. The WB gain calculation unit 80 calculates a WB gain factor for white balance correction performed in the WB correction unit 112 (step S7). For example, when the white chromaticity after correction is assumed to be RG_W, BG_W, and a gain value of G required for obtaining a sufficient brightness for an image is assumed to be Gain_G, gains of R and B are calculated by formulae (3) and (4) below. Here, the WB gain factor is assumed to be (Gain_R, Gain_G, Gain_B).

$$Gain\_R = Gain\_G/RG\_W \quad (3)$$

$$Gain\_B = Gain\_G/BG\_W \quad (4)$$

In the first embodiment, considering a chromaticity difference (chromaticity difference information) between the skin chromaticity and determined standard skin chromaticity, a white chromaticity corresponding to the determined standard skin chromaticity is corrected, which allows a white chromaticity under an illumination light source to be obtained highly accurately. In step S3 in the flowchart, the standard light source selection unit 105 determines a standard skin chromaticity located at a distance closest to the skin chromaticity in the color space as a standard skin chromaticity, but the present invention is not limited to this and a standard skin chromaticity second or third nearest to the skin chromaticity may be determined as a standard skin chromaticity.

Second Embodiment

Next, a second embodiment of the present invention will be described. The image processing apparatus according to the second embodiment is characterized in that the illuminant estimation unit 67 includes a plurality of illuminant estimation units (illuminant estimation units 67A and 67B).

Figure 14:
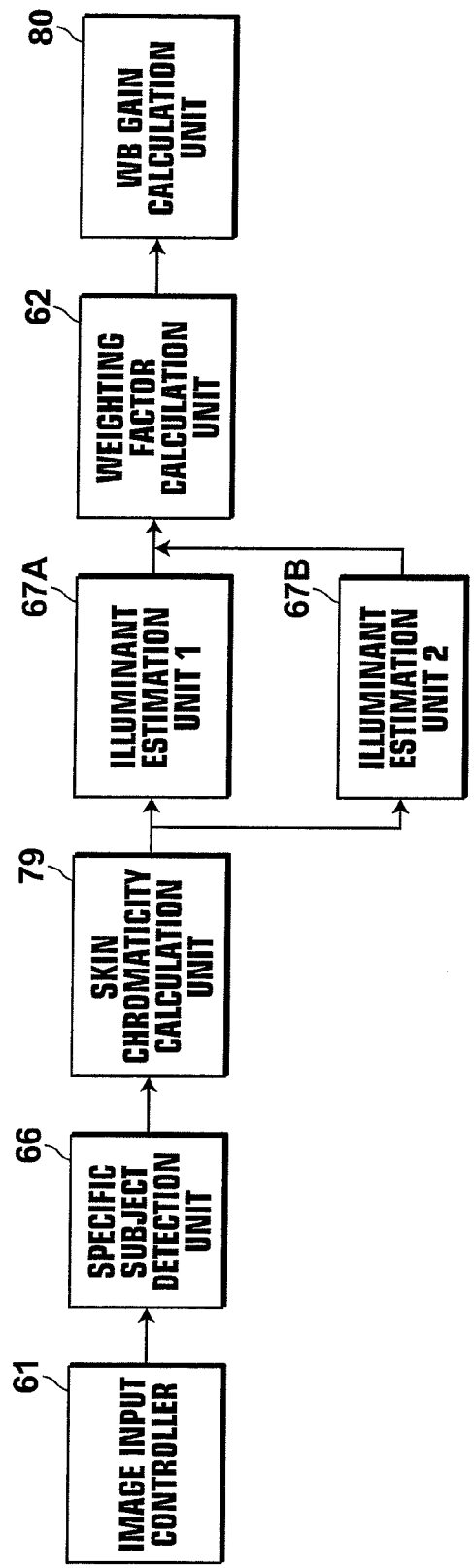
FIG. 14 is a functional block diagram related to a second embodiment.

FIG. 14 is a block diagram illustrating an electrical configuration involved in the calculation of a WB gain factor for correcting white balance in the second embodiment.

The configuration includes six units of the image input controller 61, specific subject detection unit 66, skin chromaticity calculation unit 79, illuminant estimation unit 67 (67A, 67B), weighting factor calculation unit 62, and WB gain calculation unit 80.

The specific subject detection unit 66 and skin chromaticity calculation unit 79 are identical to those described in the first embodiment.

In the second embodiment, the illuminant estimation unit 67 includes a plurality of illuminant estimation units (e.g., a first illuminant estimation unit 67A and a second illuminant estimation unit 67B). Each of the first and second illuminant estimation units 67A and 67B has a structure identical to that of the illuminant estimation unit 67 described in the first embodiment. Thus, each of the units includes the standard light source selection unit 105, skin chromaticity difference calculation unit 106, and white chromaticity calculation unit 107.

The components constituting the first illuminant estimation unit 67A are referred to as the standard light source selection unit 105A, skin chromaticity difference calculation unit 106A, and white chromaticity calculation unit 107A. Likewise, the components constituting the second illuminant estimation unit 67B are referred to as the standard light source selection unit 105B, skin chromaticity difference calculation unit 106B, and white chromaticity calculation unit 107B.

The first and second illuminant estimation units 67A and 67B may be units that calculate different standard skin chromaticities and white chromaticities as a consequence, or units that calculate the same standard skin chromaticity and white chromaticity.

The weighting factor calculation unit 62 calculates a weighting factor for calculating white chromaticity using information of chromaticity differences calculated by the first and second illuminant estimation units 67A and 67B respectively.

The WB gain calculation unit 80 is identical to that described in the first embodiment.

Figure 16:
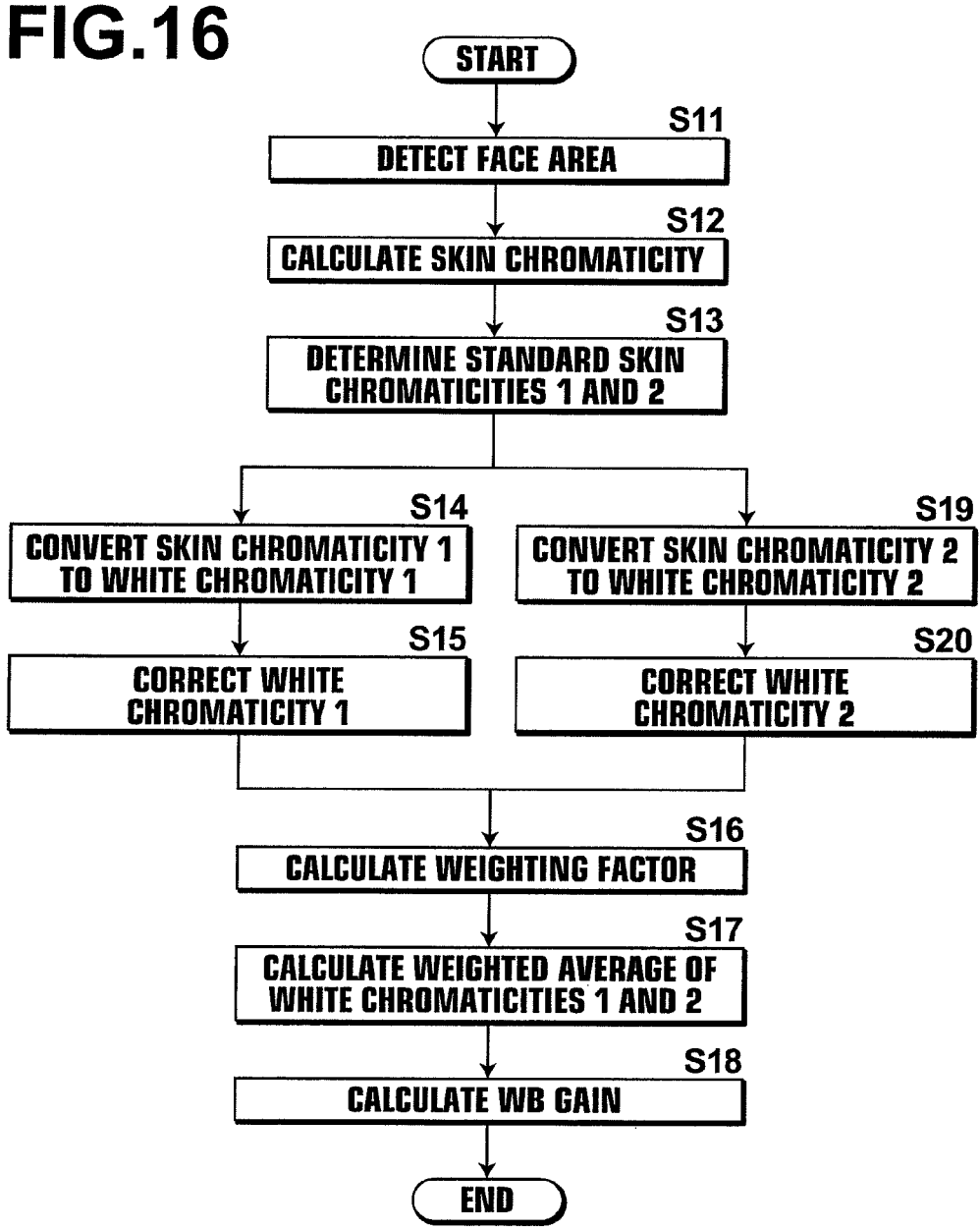
FIG. 16 is a processing flowchart related to the second embodiment.

FIG. 16 is a flowchart illustrating a processing flow involved in calculating the gain factor of white balance.

First, step S11 of the flowchart (FIG. 16) will be described. The specific subject detection unit 66 detects a specific subject (e.g., a face) from a subject represented by image data read out from the image input controller 61 and calculates RGB values or the like obtainable from the detected face area (step S11). More specifically, the specific subject detection unit 66 performs specific subject detection processing identical to that described in the first embodiment.

Next, step S12 of the flowchart will be described. The skin chromaticity calculation unit 79 eliminates unnecessary noise components, such as the background, face organs, and the like, from the face detected by the specific subject detection unit 66, and calculates a skin chromaticity (step S12). More specifically, the method described in the first embodiment is used.

Next, step S13 of the flowchart will be described. The standard light source selection unit 105 has standard skin chromaticity data that indicate the correspondence relationship between each of a variety of light sources and a standard skin chromaticity imaged under each light source, and the standard skin chromaticity data are constituted by a skin color trajectory and particular light sources 1, 2, and 3 (FIG. 9). The skin color trajectory is a blackbody trajectory that indicates a change in the skin color when color temperature of the light source is changed. A skin chromaticity with respect to each of the particular light sources 1, 2, and 3 is a skin chromaticity under a particular light source that can not be represented by a light source corresponding to the blackbody trajectory. The particular light source includes, for example, a fluorescent lamp, a mercury lamp, or the like. The standard light source selection unit 105A determines a standard skin chromaticity that approximates to the calculated skin chromaticity from the standard skin chromaticity data.

For example, the calculated skin chromaticity is compared with a predetermined standard skin chromaticity under each of variety of light sources (standard skin chromaticity data) to determine a standard skin chromaticity located at a distance closest to the skin chromaticity in the color space as the first standard skin chromaticity. In the standard light source selection unit 105B, the calculated skin chromaticity is compared with a predetermined standard skin chromaticity under each of variety of light sources (standard skin chromaticity data) to determine a standard skin chromaticity located at a distance next closest to the skin chromaticity in the color space as the second standard skin chromaticity (step S13). The term "distance" as used herein means, for example, Euclidean distance, Mahalanobis distance, or the like.

Figure 15:
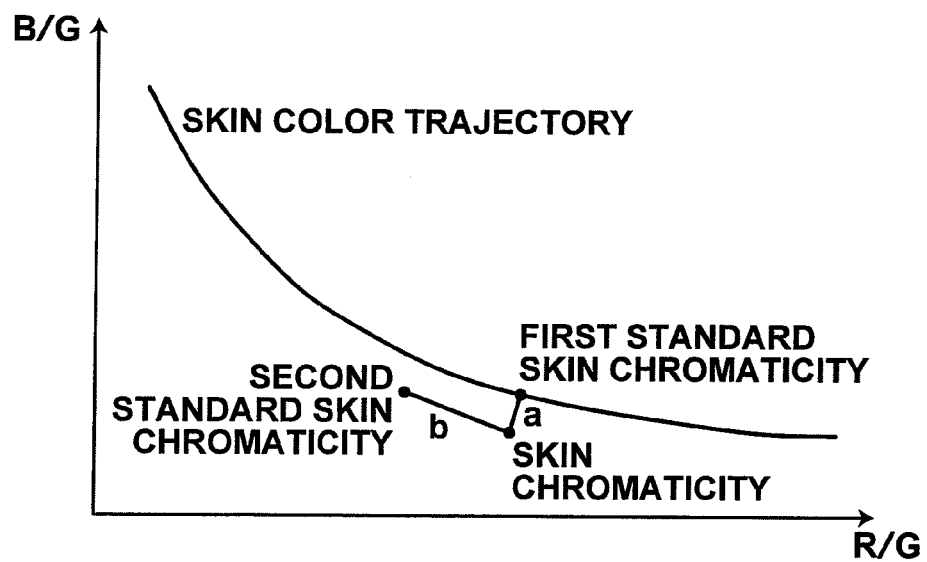
FIG. 15 is a schematic view illustrating chromaticity difference related to the second embodiment.

Next, step S14 of the flowchart will be described. The skin chromaticity difference calculation unit 106A calculates chromaticity difference information based on a chromaticity difference between the skin chromaticity in the color space and determined first standard skin chromaticity (step S14). FIG. 15 illustrates the relationships between the skin color trajectory, first standard skin chromaticity, second standard skin chromaticity, and skin chromaticity. FIG. 15 shows an example case in which the chromaticity point nearest to the skin chromaticity is on the skin color trajectory. The white chromaticity calculation unit 107 calculates a white chromaticity based on the chromaticity difference from the standard skin chromaticity determined as the first skin chromaticity. The method for calculation the white chromaticity is identical to that described in the first embodiment. The white chromaticity calculation unit 107A has white chromaticity data that indicates correspondence relationship between the skin color chromaticity and white chromaticity (FIG. 12), and may convert the first standard skin chromaticity determined in step S13 to a white chromaticity using this relationship, so that it may calculate the first white chromaticity.

Next, step S19 of the flowchart will be described. The skin chromaticity difference calculation unit 106B calculates a chromaticity difference (chromaticity difference information) based on a chromaticity difference between the skin chromaticity in the color space and determined second standard skin chromaticity (step S19). A description will be made of a case in which the skin chromaticity is located next nearest to a particular light source after the skin color trajectory. In the example case, a skin chromaticity and a second standard skin chromaticity are calculated, and thereby a chromaticity difference b between the skin chromaticity and the second standard skin chromaticity may be calculated.

The white chromaticity calculation unit 107 calculates a white chromaticity based on the chromaticity difference between the skin chromaticity and the determined second standard skin chromaticity. The method for calculating the white chromaticity is identical to that described in the first embodiment. The white chromaticity calculation unit 107B has white chromaticity data that indicates the correspondence relationship between the skin color chromaticity and white chromaticity (FIG. 12), and may convert the second standard skin chromaticity determined in step S13 to a white chromaticity using this relationship, so that it may calculate the second white chromaticity.

Next, step S15 of the flowchart will be described. The white chromaticity calculation unit 107A corrects the first white chromaticity by the method described in the first embodiment using the chromaticity difference information (chromaticity difference a).

Next, step S20 of the flowchart will be described. The white chromaticity calculation unit 107B corrects the second white chromaticity by the method described in the first embodiment using the chromaticity difference information (chromaticity difference b).

Next, step S16 of the flowchart will be described. The weighting factor calculation unit 62 calculates weighting factors by formulae (5) and (6) below using the chromaticity differences a and b calculated by the white chromaticity calculation units 107A and 107B respectively. Here, a weighting factor with respect to the first white chromaticity calculated by the white chromaticity calculation unit 107A is referred to as w1, and a weighting factor with respect to the second white chromaticity calculated by the white chromaticity calculation unit 107B is referred to as w2.

$$w1 = b/(a+b) \quad (5)$$

$$w2 = 1 - w1 \quad (6)$$

In formulae (5) and (6), the weighting factors are set such that the greater the chromaticity difference, the greater the weighting factor.

Next, step S17 of the flowchart will be described. The weighting factor calculation unit 62 calculates a weighted average of the first white chromaticity and the second white chromaticity based on the calculated w1 and w2. The weighted average white chromaticity is referred to as (RG_W, BG_W).

Next, step S18 of the flowchart will be described. The WB gain calculation unit 80 may calculate gains for R and B by formulae (7) and (8) below, when a gain value of G required for obtaining a sufficient brightness for an image (a known value obtained by photometry) is assumed to be Gain_G. Here, the WB gain factor is assumed to be (Gain_R, Gain_G, Gain_B).

$$\text{Gain\_}R = \text{Gain\_}G/RG\_W \quad (3)$$

$$\text{Gain\_}B = \text{Gain\_}G/BG\_W \quad (4)$$

In the second embodiment, illuminant estimation is performed by a plurality of circuits (illuminant estimation units 67A and 67B), so that the illuminant estimation may be performed accurately even under mixed (a plurality of) light sources.

In the second embodiment, the number of circuits related to the illuminant estimation is not limited to two, and may be any number as long as it is plural.

Further, the weighting is performed according to the chromaticity differences a and b between the skin chromaticity and the first standard chromaticity, and between the skin chromaticity and the second standard chromaticity, so that the accuracy of illuminant estimation is not degraded even under an imaging environment of a single light source scene.

Third Embodiment

Next, a third embodiment of the present invention will be described. The image processing apparatus according to the third embodiment is characterized in that the WB gain calculation unit 80 includes a plurality of WB gain calculation units (WB gain calculation units 80A and 80B).

Figure 17:
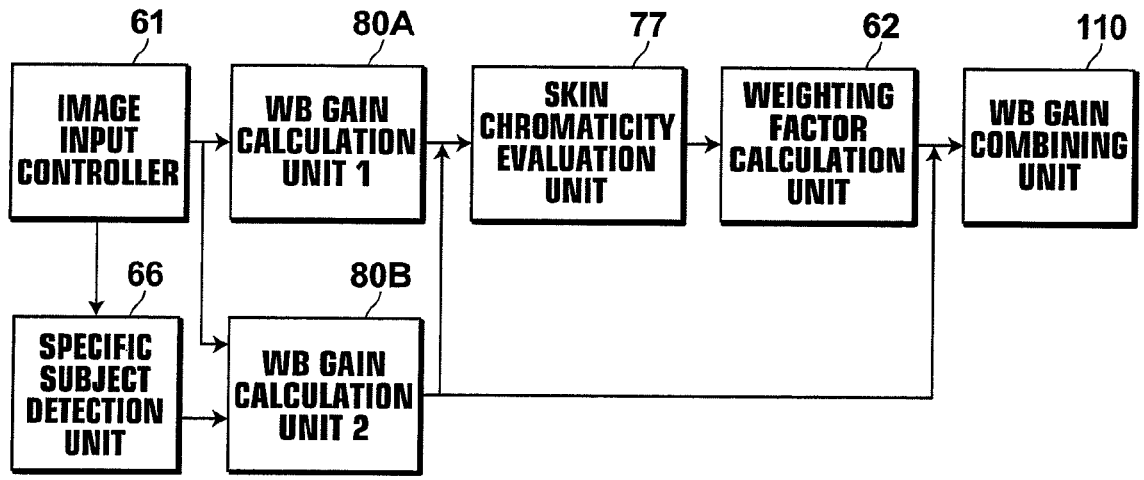
FIG. 17 is a functional block diagram related to a third embodiment.

FIG. 17 is a block diagram illustrating an electrical configuration involved in the calculation of a WB gain factor for correcting white balance in the third embodiment.

The configuration includes the image input controller 61, specific subject detection unit 66, skin chromaticity calculation unit 79 (specific chromaticity calculation unit), WB gain calculation unit (80A, 80B), skin chromaticity evaluation unit 77, weighting factor calculation unit 62, and WB gain combining unit 110 (third white balance coefficient calculation unit).

The WB gain calculation unit 80 includes a plurality of WB gain calculation units (e.g., WB gain calculation units 80A and 80B). The WB gain calculation unit 80A calculates a first WB gain factor from image data outputted from the image input controller 61.

The WB gain calculation unit 80B calculates a second gain factor by the method described in the first or second embodiment.

The skin chromaticity evaluation unit 77 (chromaticity evaluation unit) calculates a first chromaticity point by multiplying the skin chromaticity calculated by the skin chromaticity calculation unit 79 (specific chromaticity calculation unit) with the first WB gain factor, and calculates a second chromaticity point by multiplying the skin chromaticity calculated by the skin chromaticity calculation unit 79 with the second WB gain factor to evaluate positional relationship between the first and second chromaticity points in the color space. Hereinafter, a description will be made taking skin chromaticity as an example, but a specific chromaticity of a color other than the skin color may also be used.

The specific chromaticity or skin chromaticity calculated by the skin chromaticity calculation unit 79 is a chromaticity calculated using the method described in the first embodiment.

The weighting factor calculation unit 62 calculates weighting factors of the first and second WB gain factors based on the evaluation result evaluated by the skin chromaticity evaluation unit 77.

The WB gain combining unit 110 combines a plurality of gain factors calculated by a plurality of WB gain calculation units (e.g., WB gain calculation units 80A and 80B).

Figure 19:
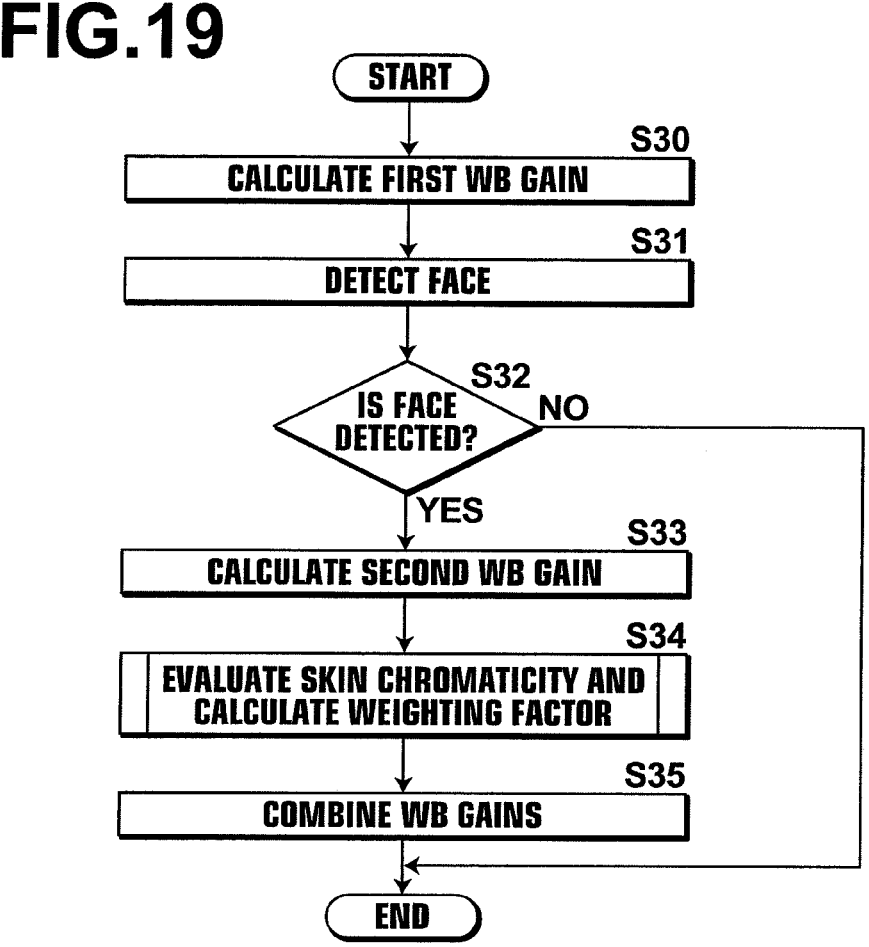
FIG. 19 is a processing flowchart related to the third embodiment (Part 1).

FIG. 19 is a flowchart illustrating a processing flow involved in combining the gain factors of the white balance.

Figure 7:
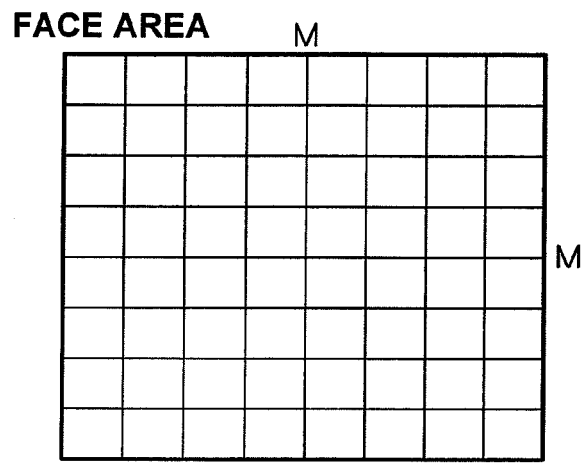
FIG. 7 illustrates divided image data.
Figure 23:
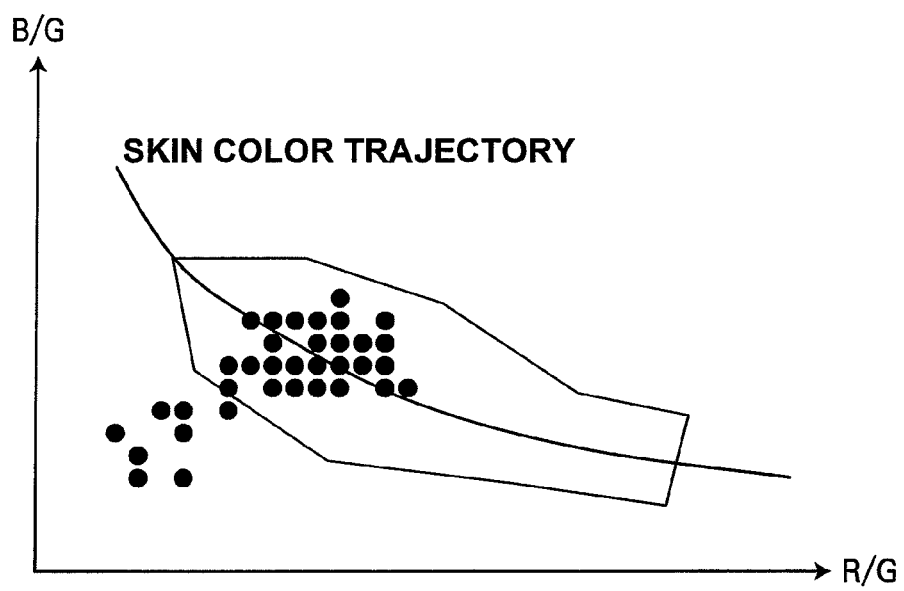
FIG. 23 is a schematic view illustrating a valid region of chromaticity points of skin.

First, step S30 of the flowchart (FIG. 19) will be described. The first gain calculation unit 80A calculates a first WB gain factor using entire image data. More specifically, the image data are divided into M×M regions (e.g., M=8), as illustrated in FIG. 7. Then, an average value of RGB values in each region is calculated, and a chromaticity point with respect to each region is plotted in R/G-B/G space based on the calculated RGB value of each region (FIG. 23). The skin color trajectory is a blackbody trajectory that indicates a change in the skin color when color temperature of the light source is changed. The polygonal shape depicted to enclose the trajectory is a discrimination region set for a white object, and chromaticity points distributed within the polygonal shape are determined as white chromaticity candidates, and chromaticity points distributed outside of the polygonal shape are determined as chromaticity points other than the white chromaticity. Assuming that the average coordinates of chromaticity points of a white object are RG1_w, BG1_w, and a gain value of G required for obtaining a sufficient brightness for an image (a known value obtained by photometry) is Gain_G, gains of R and B may be calculated by formulae (9) and (10) below.

$$Gain1\_R = Gain1\_G/RG1\_w \quad (9)$$

$$Gain1\_B = Gain1\_G/BG1\_w \quad (10)$$

The first WB gain factor (Gain_R, Gain_G, Gain_B) may be calculated in this way.

Next, step S31 of the flowchart will be described. The specific subject detection unit 66 detects a specific subject (e.g., a face) from a subject represented by image data read out from the image input controller 61 and calculates RGB values or the like obtainable from the detected face area (step S31). More specifically, it performs the specific subject detection identical to that described in the first embodiment.

Next, step S32 of the flowchart will be described. If a face area is not detected (step S32 is negative), a combining process is not performed in the WB gain combining unit 110 (third white balance coefficient calculation unit), and the first WB gain factor is determined as the final WB gain factor. If a face area is detected (step S32 is positive), the processing proceeds to the next step, step S33.

Step S33 of the flowchart will be described. A second WB gain factor is calculated by the method described in the first or second embodiment using the specific subject (face area) detected by the specific subject detection unit 66.

Figure 20:
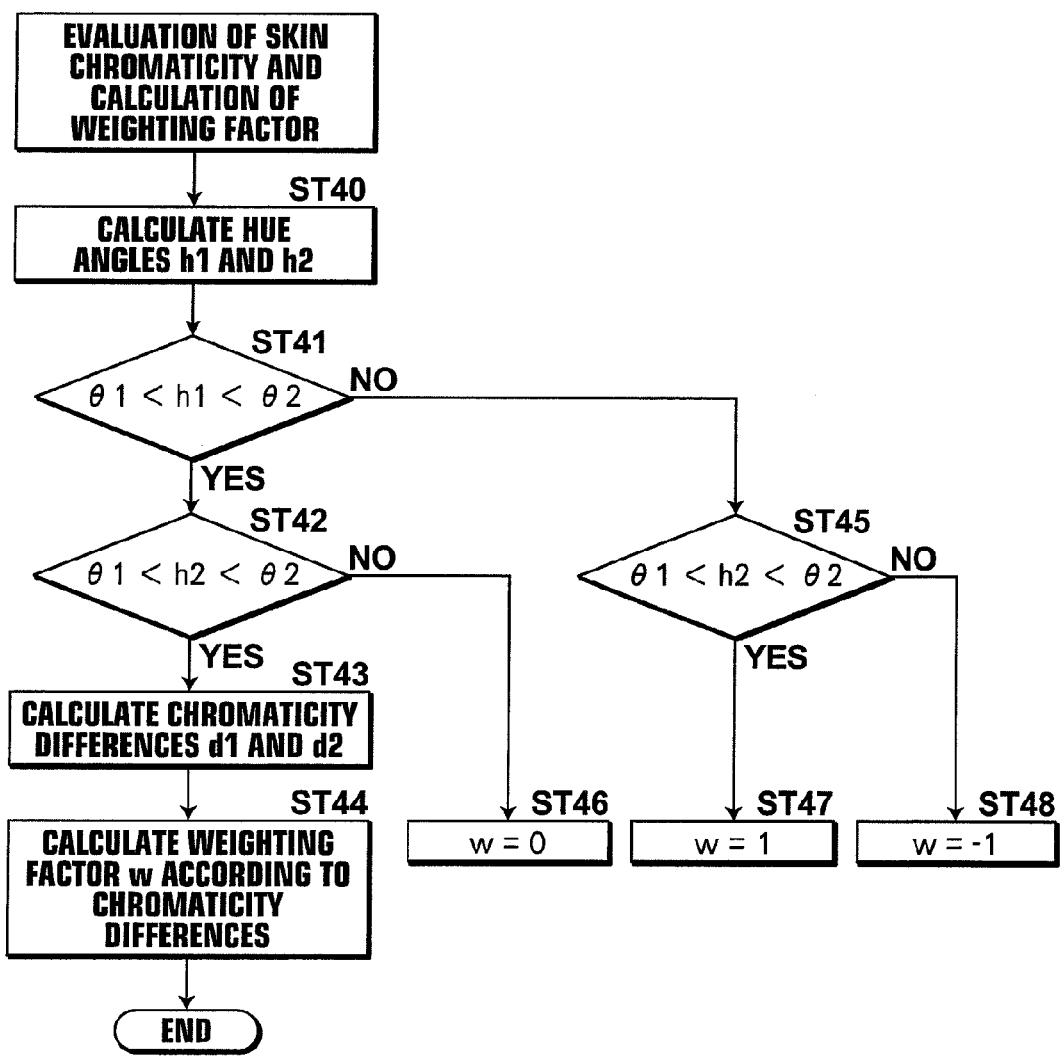
FIG. 20 is a processing flowchart related to the third embodiment (Part 2).

Next, step S34 (FIG. 19) of the flowchart will be described. Step S34 will be described with reference to the flowchart of FIG. 20.

Figure 18:
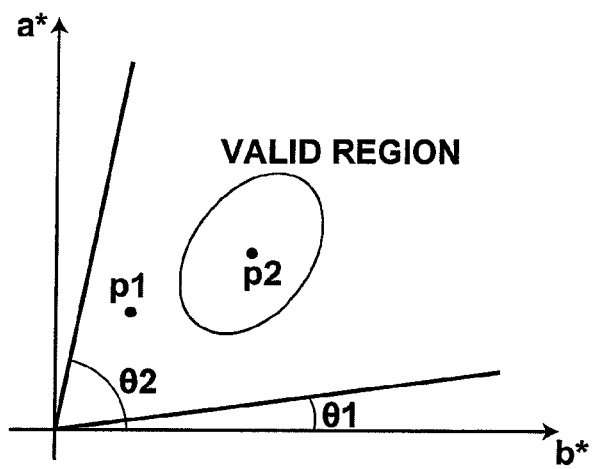
FIG. 18 is a schematic view illustrating chromaticity difference related to the third embodiment.

The skin chromaticity evaluation unit 77 calculates a chromaticity point p1 by multiplying the skin chromaticity calculated by the skin chromaticity calculation unit 79 by the first WB gain factor calculated by the first WB gain calculation unit 80A, and a chromaticity point p2 by multiplying the skin chromaticity calculated by the skin chromaticity calculation unit 79 by the second WB gain factor calculated by the second WB gain calculation unit 80B (step S40). As shown in FIG. 18, the relationship between the chromaticity points p1 and p2 in the a*-b* space of L*a*b color space is evaluated. A hue angle h1 is evaluated as to whether or not it is within the range from an angle θ1 to an angle θ2 (step S41). If the hue angle h1 is within the range from the angle θ1 to θ2 (step S41 is positive), a hue angle h2 is evaluated as to whether or not it is within the range from the angle θ1 to θ2 (step S42). Next, if the hue angle h2 is within the range from the angle θ1 to θ2 (step S42 is positive), respective chromaticity differences d1 and d2 (chromaticity difference information) of the chromaticity points p1 and p2 from a valid region are calculated (step S43). The term "chromaticity difference" as used herein means Euclidean distance, Mahalanobis distance, or the like.

Thereafter, a weighting factor w is calculated by the weighting factor calculation unit 62 using the chromaticity difference information (step S44). More specifically, if the chromaticity point is located within the valid region set as a preferable skin color range, the chromaticity difference is 0. The weighting factor w is calculated by formula (11) below according to the chromaticity differences d1 and d2. If both of the chromaticity differences d1 and d2 are 0, the weighting factor is set to 0.5.

$$w = d1/(d1+d2) \quad (11)$$

If the hue angle h2 is outside of the range from the angle θ1 to θ2 (step S42 is negative), the weighting factor is calculated as w=0 by the weighting factor calculation unit 62 (step S46). In this way, when an inappropriate gain factor is calculated in the calculation of first WB gain factor through false recognition of an object having a different color as a white object, or when an inappropriate gain factor is calculated in the calculation of second WB gain factor through false detection of a face area, the white balance processing may handle the case appropriately.

In the mean time, if the hue angle h1 is outside of the range from the angle θ1 to θ2 (step S41 is negative), the hue angle h2 is evaluated as to whether or not it is within the range from the angle θ1 to θ2 (step S45). If the hue angle h2 is within the range from the angle θ1 to θ2 (step S45 is positive), the weighting factor is calculated as w=1 by the weighting factor calculation unit 62 (step S47). If the hue angle h2 is outside of the range from the angle θ1 to θ2 (step S45 is negative), the weighting factor is calculated as w=-1 by the weighting factor calculation unit 62 (step S48). In this case, it may be determined that the first and second gain factors are inappropriate, and a predetermined WB gain (known setting value) corresponding to a known light source (e.g., daylight light source, D=50) may be set as the final WB gain in the WB gain combining unit 110 (third white balance coefficient calculation unit).

Next, step S35 of the flowchart will be described. The WB gain combining unit 110 takes a weighted average of the first WB gain factor (Gain1_R, Gain1_G, Gain1_B) and the second WB gain factor (Gain2_R, Gain2_G, Gain2_B) according to the value of the weighting factor w to calculate a final WB gain factor (Gain_R, Gain_G, Gain_B) as in formulae (12) to (14) below.

$$Gain\_R = Gain1\_R \times (1-w) + Gain2\_R \times w \quad (12)$$

$$Gain\_G = Gain1\_G \times (1-w) + Gain2\_G \times w \quad (13)$$

$$Gain\_B = Gain1\_B \times (1-w) + Gain2\_B \times w \quad (14)$$

It has been described that the skin chromaticity evaluation unit 77 and the weighting factor calculation unit 62 are separate circuits, but the weighting factor calculation unit 62 may be incorporated in the skin chromaticity evaluation unit 77.

Fourth Embodiment

Figure 21:
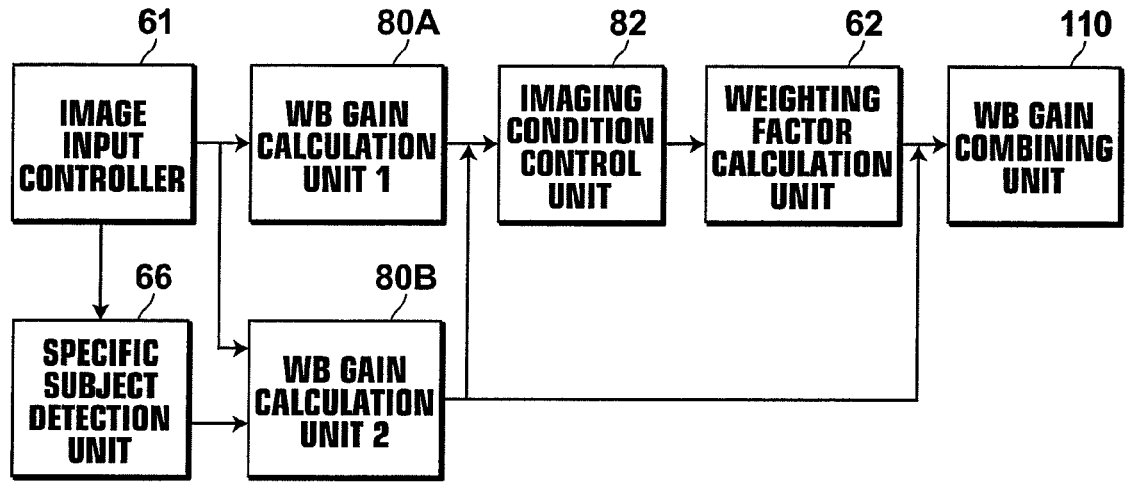
FIG. 21 is a functional block diagram related to a fourth embodiment.

Next, a fourth embodiment of the present invention will be described. FIG. 21 is a block diagram illustrating an electrical configuration involved in the calculation of a WB gain factor for correcting white balance.

The configuration includes the image input controller 61, specific subject detection unit 66, WB gain calculation unit (80A, 80B), imaging condition control unit 82, weighting factor calculation unit 62, and WB gain combining unit 110. The image input controller 61, specific subject detection unit 66 and WB gain calculation unit (80A, 80B) have identical functions to those described in the third embodiment.

The imaging condition control unit 82 calculates at least flash ON/OFF information as an imaging condition.

The weighting factor calculation unit 62 (luminance weighting factor calculation unit) calculates a luminance weighting factor by considering the imaging condition.

The WB gain combining unit 110 (third white balance coefficient calculation unit) combines, using the luminance weighting factor, the first and second WB gain factors calculated by the first and second WB gain calculation units 80A and 80B respectively to calculate a final WB gain factor.

Figure 22:
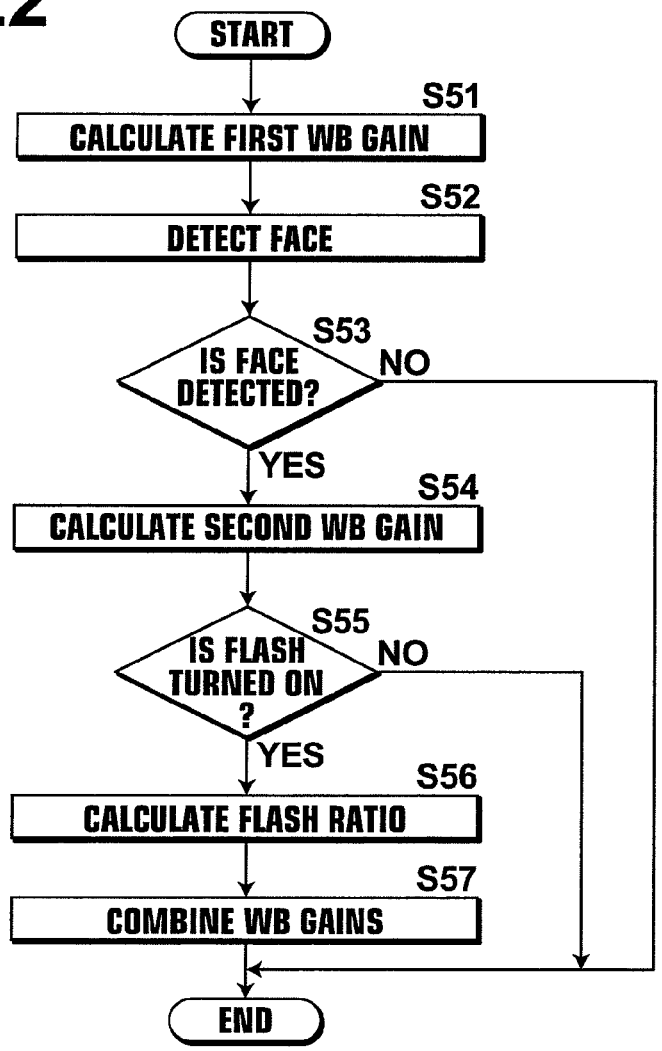
FIG. 22 is a processing flowchart related to the fourth embodiment.

FIG. 22 is a flowchart illustrating a processing flow involved in combining the gain factors of white balance.

First, step S51 of the flowchart (FIG. 22) will be described. The first gain calculation unit 80A calculates a first WB gain factor using the method described in the third embodiment.

Next, step S52 of the flowchart will be described. The specific subject detection unit 66 detects a specific subject (e.g., a face) from a subject represented by image data read out from the image input controller 61 and calculates RGB values or the like obtainable from the detected face area. More specifically, the method described in the first embodiment is used.

Next, step S53 of the flowchart will be described. If a face area is not detected (step S53 is negative), a combining process is not performed in the WB gain combining unit 110 (third white balance coefficient calculation unit), and the first WB gain factor is determined as the final WB gain factor. If a face area is detected (step S53 is positive), the processing proceeds to the next step, step S54.

Next, step S54 of the flowchart will be described. A WB gain factor finally calculated by the method using information of the specific subject (face area) detected by the specific subject detection unit 66, as described in the first or second embodiment, is calculated as a second WB gain factor.

Next, step S55 of the flowchart will be described. When a flash emission is not performed by the flash light 24 (step S55 is negative), the second WB gain factor is calculated as the final WB gain. If flash emission is performed by the flash light 24 (step S55 is positive), the processing proceeds to step S56.

Performance or non-performance of flash emission by the flash light 24 is known since the flash light is controlled by the imaging condition control unit 82 and control information (including control information whether or not a flash emission is performed by the flash light 24) is recorded in the imaging condition control unit 82.

Further, the weighting factor calculation unit 62 (second luminance ratio calculation section) obtains control information from the imaging condition control unit 82 and calculates a flash light ratio over the entire region of image data as a ratio 1. In addition, the weighting factor calculation unit 62 (first luminance ratio calculation section) calculates a flash light ratio of a face area as a ratio 2. Thereby a flash emission ratio is calculated.

The weighting factor calculation unit 62 (first luminance ratio calculation section) calculates the ratio 2 from the luminance value calculated from a face area detected by the specific subject detection unit 66.

Figure 24:
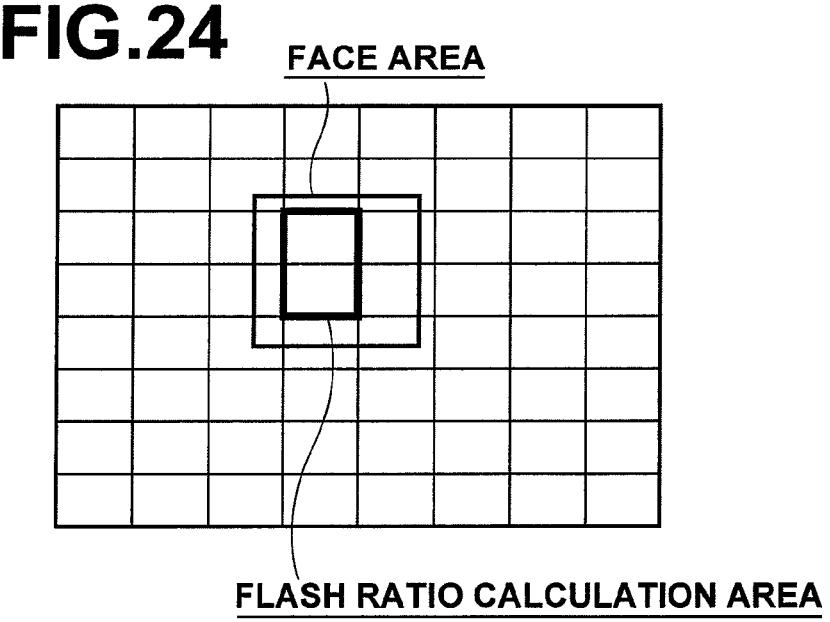
FIG. 24 is a schematic view illustrating a face area and a flash ratio calculation area (Part 1).

More specifically, as illustrated in FIG. 24, image data region is divided into blocks, and, when performing flash photography, luminance values of each block at the time of non-flash emission and at the time of flash emission are obtained and recorded in the flame memory 68.

The weighting factor calculation unit 62 (luminance weighting factor calculation section) calculates the ratio 2 using a flash ratio calculation area which is an area formed of divided blocks included in the face area detected by the specific subject detection unit 66.

A luminance average of the blocks of the flash ratio calculation area before flash emission which is obtainable from a pre-image obtained at the time of luminance adjustment is calculated as Y1. Further, a luminance value obtained by subtracting Y1 from a luminance average of the blocks of the flash ratio calculation area at the time of flash emission is calculated as Y2. The flash ratio 2 is calculated by formula (15) below.

The flash ratio, ratio 1, over the entire image data is also calculated in the same manner.

$$\text{Ratio } 2 = 100 \times Y2/(Y1+Y2) \quad (15)$$

Figure 26:
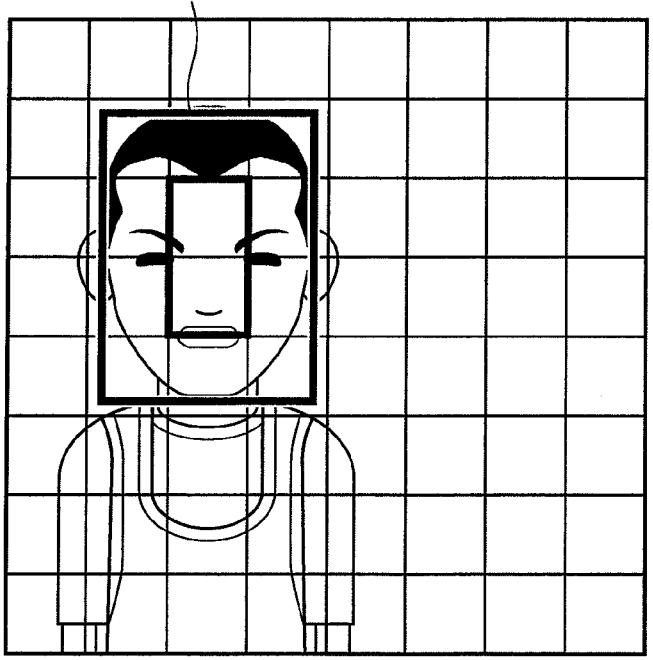
FIG. 26 is a schematic view illustrating a face area and a flash ratio calculation area (Part 2).

FIG. 26 illustrates a block divided image data region with an imaged person superimposed thereon. The use of the flash ratio calculation area which is slightly smaller than the face area results in the flash ratio calculation area to have a greater ratio of skin portion (FIG. 26). This allows a luminance value of skin to be optimally obtained.

Where the face area does not include any divided block, the divided block having a largest area overlapping with the face area may be used as the flash ratio calculation area.

Figure 25:
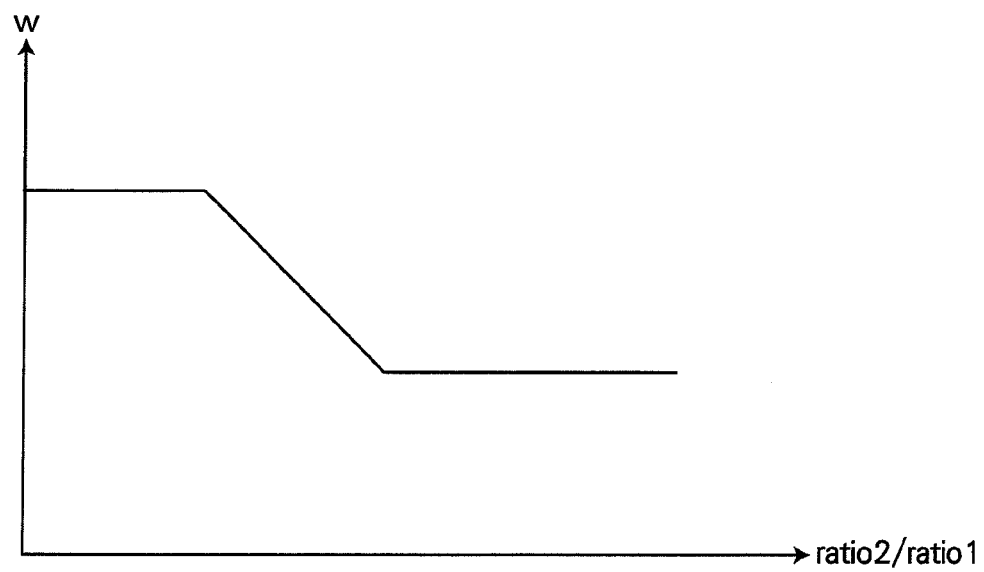
FIG. 25 is a schematic view illustrating the relationship between luminance weighting factor and light ratio.

Next, step S57 of the flowchart will be described. The WB gain combining unit 110 (third white balance coefficient calculation unit) calculates a luminance weighting factor w for the second WB gain according to the ratio between ratio 1 and ration 2 calculated by the weighting factor calculation unit 62 (first luminance ratio calculation unit, second luminance ratio calculation unit). FIG. 25 is a lookup table representing the relationship between the ratio 2/ratio 1 and the luminance weighting factor w for the second WB gain factor. Thus, the luminance weighting factor w may be calculated using the lookup table. Where ratio 2 is sufficiently great relative to ratio 1, the face and the background differ in flash ratio, so that if a greater weight is set to the second WB gain factor it is likely that the background color is spoiled. On the other hand, where ratio 1 and ratio 2 are comparable, it is possible to set the weight for the highly reliable second WB gain factor to a great value.

In this way, the weighting factor calculation unit 62 (luminance weighting factor calculation unit) calculates the weighting factor w. Then, the WB gain combining unit 110 (third white balance coefficient calculation unit) performs weighted averaging on the first WB gain factor (Gain1_R, Gain1_G, Gain1_B) and second WB gain factor (Gain2_R, Gain2_G, Gain2_B) according to the value of the luminance weighting factor w, as in formulae (16), (17), and (18) below to calculate a final WB gain factor (Gain_R, Gain_G, Gain_B).

$$\text{Gain}\_R = \text{Gain1}\_R \times (1-w) + \text{Gain2}\_R \times w \quad (16)$$

$$\text{Gain}\_G = \text{Gain1}\_G \times (1-w) + \text{Gain2}\_G \times w \quad (17)$$

$$\text{Gain}\_B = \text{Gain1}\_B \times (1-w) + \text{Gain2}\_B \times w \quad (18)$$

So far the first to fourth embodiments have been described. The WB correction unit 112 (white balance correction unit) may perform a white balance correction on the image data using the final WB gain factor calculated in each of the embodiments.

Although the description of the present invention has been made taking a skin color as an optimal example of a specific color, the present invention is not limited to the skin color.

What is claimed is:
1. An imaging apparatus comprising:
   a flash emission unit capable of emitting flash light;
   an imaging condition control unit that controls imaging conditions including control of flash emission of the flash emission unit;

an image pickup unit that obtains a color image by imaging a subject;

a specific subject detection unit that detects a specific subject having a specific color from the color image obtained by the image pickup unit;

a first white balance coefficient calculation unit that calculates a first white balance coefficient based on the color image;

a second white balance coefficient calculation unit that calculates a second white balance coefficient based on the specific subject;

a luminance weighting factor calculation unit that calculates a luminance weighting factor based on presence or absence of flash emission controlled by the imaging condition control unit;

a third white balance coefficient calculation unit that calculates a third white balance coefficient by weighting the first white balance coefficient and the second white balance coefficient according to the luminance weighting factor; and a white balance correction unit that corrects the color image using the calculated third white balance coefficient.

2. The imaging apparatus according to claim 1, wherein:

the apparatus further includes a specific chromaticity calculation unit that calculates a specific chromaticity from the specific color representing the specific subject; and the second white balance coefficient calculation unit includes:

a database having standard chromaticity data that indicate the correspondence relationship between each of a variety of light sources and each of a plurality of standard chromaticities imaged under each of the light sources, and white chromaticity data that indicate the correspondence relationship between a chromaticity of the specific color and a chromaticity of a white color;

a standard light source selection unit that determines a standard chromaticity that approximates to the calculated specific chromaticity from the standard chromaticities and selects one or more light sources corresponding to the determined standard chromaticity;

a chromaticity difference calculation unit that calculates one or more sets of chromaticity difference information representing a chromaticity difference from the determined standard chromaticity to the calculated specific chromaticity; and a white chromaticity correction unit that obtains one or more white chromaticities corresponding to the determined standard chromaticity based on the white chromaticity data and corrects the one or more white chromaticities by referring to the one or more sets of chromaticity difference information.

3. The imaging apparatus according to claim 1, wherein the third white balance coefficient calculation unit sets the value of the third white balance coefficient to the value of the second white balance coefficient in response to an instruction not to perform flash emission from the imaging condition control unit.

4. The imaging apparatus according to claim 1, wherein the image pickup unit obtains a pre-image in response to an instruction to perform flash emission from the imaging condition control unit prior to the flash emission.

5. The imaging apparatus according to claim 4, wherein the luminance weighting coefficient calculation unit includes a first luminance ratio calculation unit that calculates a ratio between a luminance value of the detected specific subject and a luminance value of a region of the pre-image corresponding to the specific subject as a first luminance ratio, and a second luminance ratio calculation unit that calculates a ratio between a luminance value of a region of the color image not including the specific subject and a luminance value of a region of the pre-image corresponding to the region of the color image not including the specific subject as a second luminance ratio, and calculates the luminance weighting factor based on the first luminance ratio and the second luminance ratio.

6. The imaging apparatus according to claim 5, wherein the luminance weighting coefficient calculation unit is a unit that calculates the luminance weighting factor by referring to a lookup table indicating the relationship between a ratio of the second luminance ratio to the first luminance ratio and a luminance weighting factor.

7. The imaging apparatus according to claim 1, wherein the specific color is a skin color.

8. An imaging method comprising the steps of:

obtaining a color image by imaging a subject using controlled flash emission;

detecting a specific subject having a specific color from the obtained color image;

calculating a first white balance coefficient based on the obtained color image;

calculating a second white balance coefficient based on the detected specific subject;

calculating a luminance weighting factor based on presence or absence of the controlled flash emission;

calculating a third white balance coefficient by weighting the first white balance coefficient and the second white balance coefficient according to the luminance weighting factor; and correcting the color image using the calculated third white balance coefficient.

9. A computer readable non-transitory recording medium on which is recorded a program for causing a computer to perform the functions of:

causing flash light to be emitted;

controlling imaging conditions including control of the flash emission;

causing a color image representing a subject to be imaged;

detecting a specific subject having a specific color from the obtained color image;

calculating a specific chromaticity from the specific color representing the specific subject;

calculating a first white balance coefficient based on the color image;

calculating a second white balance coefficient based on the specific subject;

calculating a luminance weighting factor based on presence or absence of the controlled flash emission;

calculating a third white balance coefficient by weighting the first white balance coefficient and the second white balance coefficient according to the luminance weighting factor; and correcting the color image using the calculated third white balance coefficient.

* * * * *